US011876433B2

(12) United States Patent
Ishikawa et al.

(10) Patent No.: US 11,876,433 B2
(45) Date of Patent: Jan. 16, 2024

(54) DRIVE DEVICE

(71) Applicant: Nidec Corporation, Kyoto (JP)

(72) Inventors: Yuki Ishikawa, Kyoto (JP); Hitoshi Kuroyanagi, Kyoto (JP); Naohiro Wada, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 242 days.

(21) Appl. No.: 17/519,820

(22) Filed: Nov. 5, 2021

(65) Prior Publication Data

US 2022/0158528 A1 May 19, 2022

(30) Foreign Application Priority Data

Nov. 19, 2020 (JP) .................................. 2020-192836
Jun. 16, 2021 (JP) .................................. 2021-100087

(51) Int. Cl.
*H02K 9/19* (2006.01)
*B60L 50/51* (2019.01)
(Continued)

(52) U.S. Cl.
CPC ................ *H02K 9/19* (2013.01); *B60L 50/51* (2019.02); *H02K 1/20* (2013.01); *H02K 1/32* (2013.01);
(Continued)

(58) Field of Classification Search
CPC . H02K 9/19; H02K 1/20; H02K 7/116; H02K 1/32; H02K 7/006; H02K 11/33;
(Continued)

(56) References Cited

U.S. PATENT DOCUMENTS 7,775,060 B2 * 8/2010 Nakajima ................. B60L 1/02
62/505
8,448,541 B2 * 5/2013 Kasuya .................. B60L 50/16
180/65.245

(Continued)

FOREIGN PATENT DOCUMENTS

| JP | 2016-073163 A | 5/2016 |
| WO | 2013/069774 A1 | 5/2013 |
| WO | 2019/216043 A1 | 11/2019 |

OTHER PUBLICATIONS

Official Communication issued in corresponding Chinese Patent Application No. 202111347095.0, dated Aug. 27, 2023.

*Primary Examiner* — Alex W Mok
(74) *Attorney, Agent, or Firm* — Keating & Bennett, LLP

(57) ABSTRACT

A housing of a drive device includes a tubular portion, a side plate portion, a plate portion, and a peripheral wall portion. The tubular portion extends in a first direction and accommodates a motor. The side plate portion has a plate shape intersecting the first direction, and is at one end portion of the tubular portion in the first direction. The plate portion expands from the tubular portion along one of the first direction and a second direction perpendicular to the first direction. The peripheral wall portion surrounds an inverter accommodation portion that accommodates inverter when viewed from a third direction perpendicular to the first direction and the second direction, and is connected to the plate portion. Each of a pump and an oil cooler is at any of one end portion of the peripheral wall portion in the second direction, another end portion of the plate portion in the third direction, and another end portion of the side plate portion in the first direction.

10 Claims, 24 Drawing Sheets

(51) Int. Cl.
*H02K 1/20* (2006.01)
*H02K 1/32* (2006.01)

(52) U.S. Cl.
CPC ..... *B60L 2210/40* (2013.01); *B60L 2240/425* (2013.01)

(58) Field of Classification Search
CPC ......... H02K 7/003; B60L 1/003; B60L 50/51; B60L 3/0061; B60L 2210/40; B60L 2240/425; Y02T 10/70
USPC .......................................................... 310/54
See application file for complete search history.

(56) References Cited

U.S. PATENT DOCUMENTS

| | | | |
|---|---|---|---|
| 9,608,492 B2 * | 3/2017 | Nagumo | H02K 3/28 |
| 10,270,314 B2 * | 4/2019 | Matsuda | H02K 7/116 |
| 2004/0163409 A1 * | 8/2004 | Nakajima | B60L 3/003 62/505 |
| 2016/0099633 A1 | 4/2016 | Yoshinori et al. | |
| 2020/0106344 A1 * | 4/2020 | Okuhata | H02K 11/33 |
| 2020/0124161 A1 * | 4/2020 | Ogasawara | H02K 7/006 |
| 2020/0127527 A1 * | 4/2020 | Nakamatsu | H02K 7/116 |
| 2020/0208631 A1 * | 7/2020 | Kataoka | F04C 15/0057 |
| 2020/0244143 A1 * | 7/2020 | Kiyooka | H02K 7/116 |
| 2020/0266687 A1 * | 8/2020 | Nakamatsu | H02K 5/20 |
| 2020/0300353 A1 * | 9/2020 | Ishikawa | F16H 57/037 |
| 2020/0308999 A1 * | 10/2020 | Kobayashi | F16N 13/20 |
| 2020/0309119 A1 * | 10/2020 | Kataoka | H02K 11/33 |

* cited by examiner

DRIVE DEVICE

CROSS-REFERENCE TO RELATED APPLICATIONS

The present application claims priority under 35 U.S.C. § 119 to Japanese Patent Application No. 2020-192836, filed on Nov. 19, 2020, and Japanese Patent Application No. 2021-100087, filed on Jun. 16, 2021, the entire contents of which are hereby incorporated herein by reference.

1. Field of the Invention

The present disclosure relates to a drive device.

2. Background

Conventionally, an electric motor mounted on a vehicle or the like is cooled by supply of a refrigerant such as cooled oil. For example, the refrigerant is supplied from a pump disposed outside the electric motor.

In the conventional technology, there is a possibility that the drive device increases in size and becomes difficult to dispose inside the vehicle depending on disposition of a pump.

SUMMARY

A drive device according to an example embodiment of the present disclosure includes a motor, an inverter, a housing, a pump, and an oil cooler. The motor includes a rotor including a motor shaft, and a stator. The motor shaft is rotatable about a rotation axis extending along a first direction. The stator is radially outward of the rotor. The inverter supplies drive power to the motor. The housing accommodates the motor and the inverter. The pump supplies oil accommodated in the housing to the motor. The oil cooler cools the oil. The housing includes an inverter accommodation portion, a tubular portion, a side plate portion, a plate portion, and a peripheral wall portion. The inverter accommodation portion accommodates the inverter. The tubular portion extends in the first direction and accommodates the motor. The side plate portion includes a plate shape intersecting the first direction, and is at one end portion of the tubular portion on one side in the first direction. The plate portion expands from the tubular portion along one of the first direction and a second direction perpendicular to the first direction. The peripheral wall portion surrounds the inverter accommodation portion when viewed from a third direction perpendicular to the first direction and the second direction, and is connected to the plate portion. Both of the pump and the oil cooler is at any of one end portion of the peripheral wall portion in the second direction, another end portion of the plate portion in the third direction, and another end portion of the side plate portion in the first direction.

The above and other elements, features, steps, characteristics and advantages of the present disclosure will become more apparent from the following detailed description of the example embodiments with reference to the attached drawings.

DETAILED DESCRIPTION

Figure 1:
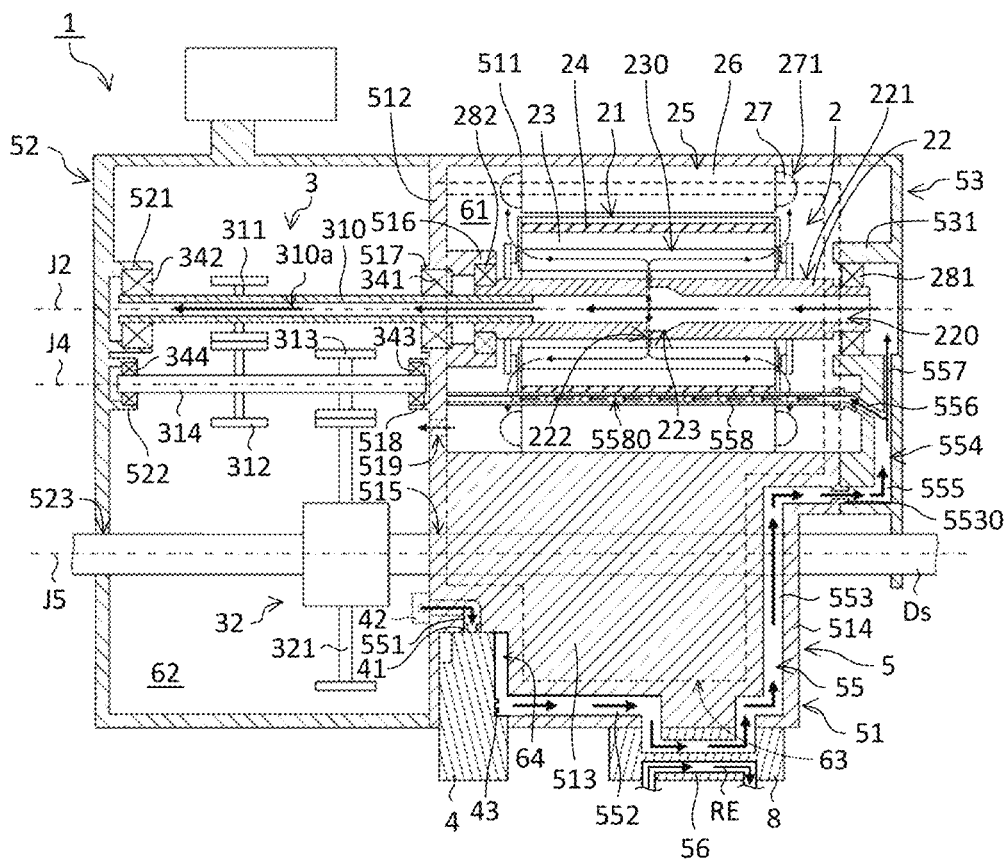
FIG. 1 is a schematic configuration view of a drive device according to an example embodiment of the present disclosure viewed from a Z axis direction.
Figure 1:
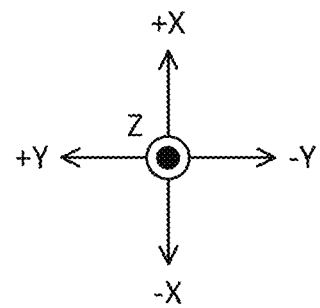

Example embodiments will be described below with reference to the drawings.

The following description will be made with the direction of gravity being partitioned based on a positional relationship in the case where a drive device 1 is mounted in a vehicle located on a horizontal road surface. In the drawings, an XYZ coordinate system is appropriately shown as a three-dimensional orthogonal coordinate system. In the XYZ coordinate system, the Z axis direction indicates the vertical direction (i.e., up-down direction). The +Z direction is upward (vertically upward opposite to the gravity direction), and the −Z direction is downward (vertically downward in the same direction as the gravity direction). The "Z axis direction" in the following description is an example of the "third direction" of the present disclosure. Furthermore, the "+Z direction" in the following description is an example of "one side of the third direction" of the present disclosure, and the "−Z direction" in the following description is an example of "the other side of the third direction" of the present disclosure.

The X axis direction is a direction orthogonal to the Z axis direction and shows the front-rear direction of a vehicle 200 in which the drive device 1 is mounted. The +X direction is the front of the vehicle 200, and the −X direction is the rear of the vehicle 200. However, the +X direction can be the rear of the vehicle 200, and the −X direction can be the front of the vehicle 200. The "X axis direction" in the following description is an example of the "second direction" of the present disclosure. Furthermore, the "−X direction" in the following description is an example of "one side in the second direction" of the present disclosure, and the "+X direction" in the following description is an example of "the other side in the second direction" of the present disclosure.

The Y axis direction is a direction orthogonal to both the X axis direction and the Z axis direction and indicates the width direction (right-left direction) of the vehicle 200. The +Y direction is the left of the vehicle 200, and the −Y direction is the right of the vehicle 200. However when the +X direction is the rear of the vehicle 200, the +Y direction can be the right of the vehicle 200, and the −Y direction can be the left of the vehicle 200. That is, regardless of the X axis direction, the +Y direction simply becomes one side in the right-left direction of the vehicle 200, and the −Y direction becomes the other side in the right-left direction of the vehicle 200. Depending on a method for mounting the drive device 1 on the vehicle 200, the X axis direction can be the width direction (right-left direction) of the vehicle 200, and the Y axis direction can be the front-rear direction of the vehicle 200. In the following example embodiment, the Y axis direction is parallel to, for example, a rotation axis J2 of a motor 2. Therefore, the Y axis direction is sometimes simply referred to as an "axial direction". The "Y axis direction" of the present example embodiment is an example of the "first direction" of the present disclosure. Furthermore, the "+Y direction" in the following description is an example of "one side of the first direction" of the present disclosure, and the "−Y direction" in the following description is an example of "the other side of the first direction" of the present disclosure.

Unless otherwise specified in the following description, the direction (Y axis direction) parallel to a predetermined axis such as the rotation axis J2 of the motor 2 is sometimes simply referred to as an "axial direction". Furthermore, a direction orthogonal to a predetermined axis is simply referred to as a "radial direction", and a circumferential direction about a predetermined axis is referred to as a "circumferential direction". Of the radial direction, an orientation approaching an axis is referred to as "radially inward", and an orientation separating from the axis is referred to as "radially outward". In each component, an end portion radially inward is referred to as a "radially inner end portion". Furthermore, an end portion outward is referred to as a "radially outer end portion". Of the side surface of each component, a side surface facing radially inward is referred to as "radial inward surface", and a side surface facing radially outward is referred to as "radial outward surface".

In each component, an end portion in the circumferential direction is referred to as a "circumferential end portion". The position of a circumferential end portion in the circumferential direction is referred to as a "circumferential end". An end portion in one circumferential direction is referred to as "one circumferential end portion". Furthermore, an end portion in the other circumferential direction is referred to as "the other circumferential end portion". In addition, of the side surface of each component, a side surface facing the circumferential direction is referred to as a "circumferential side surface". Furthermore, the side surface facing the one circumferential side is referred to as "one circumferential side surface", and the side surface facing the other circumferential side is referred to as "the other circumferential side surface".

In a positional relationship between any one and another of the azimuth, the line, and the surface, "parallel" includes not only a state in which the two endlessly extend without intersecting at all but also a state in which the two are substantially parallel. The terms "perpendicular" and "orthogonal" each indicate not only a state in which the both intersect at 90 degrees with each other but also a state in which they are substantially perpendicular and a state in which they are substantially orthogonal. That is, the terms "parallel", "perpendicular", and "orthogonal" each include a state in which the positional relationship between both has an angular deviation that does not depart from the gist of the present disclosure.

Note that these are names used merely for description, and are not intended to limit actual positional relationships, directions, names, and the like.

Figure 2:
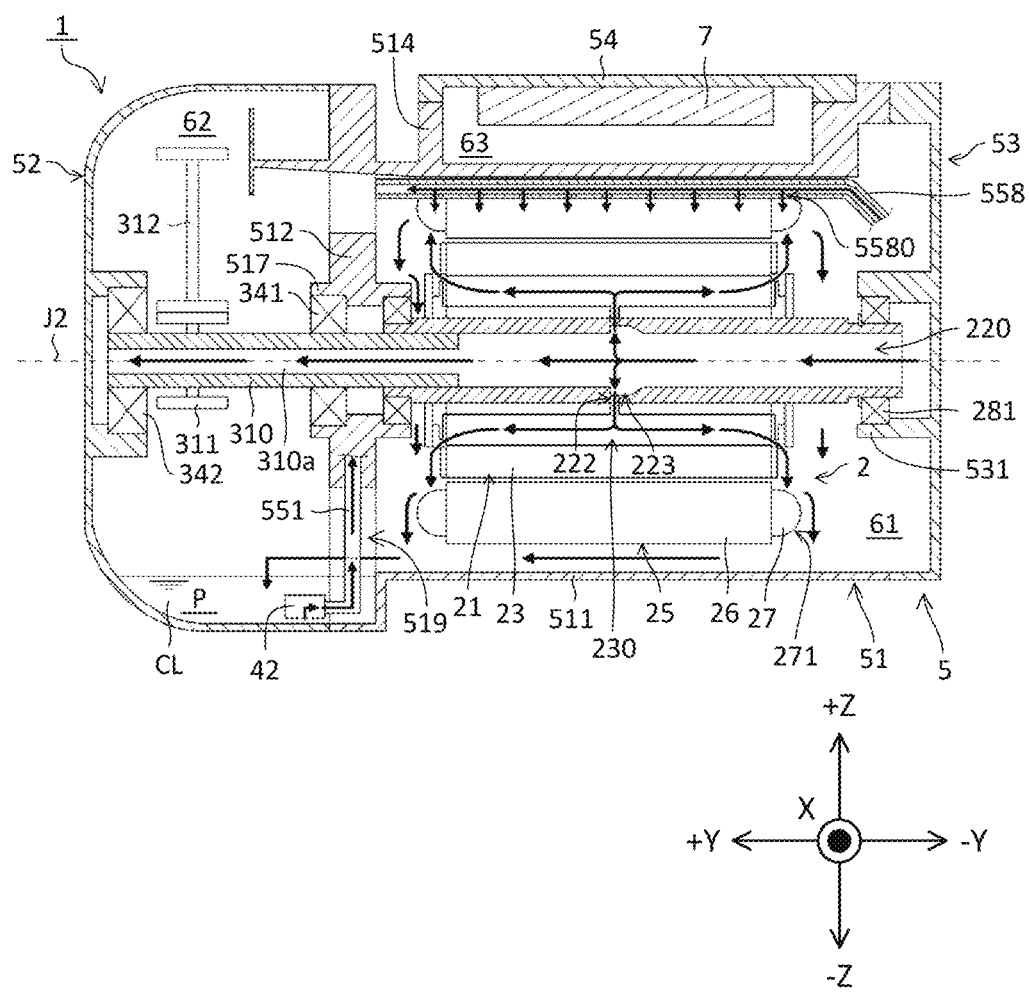
FIG. 2 is a schematic configuration view of the drive device viewed from an X axis direction.
Figure 3:
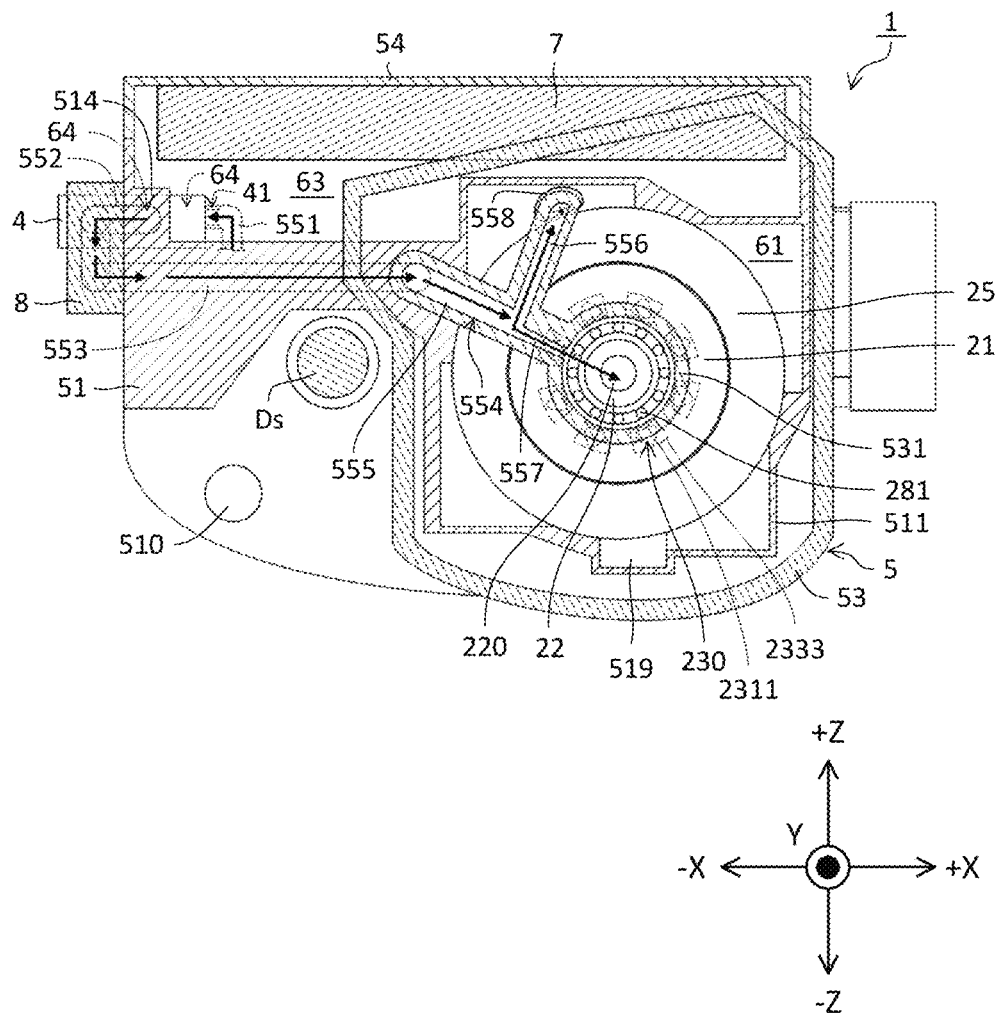
FIG. 3 is a schematic configuration view of the drive device viewed from a Y axis direction.
Figure 4:
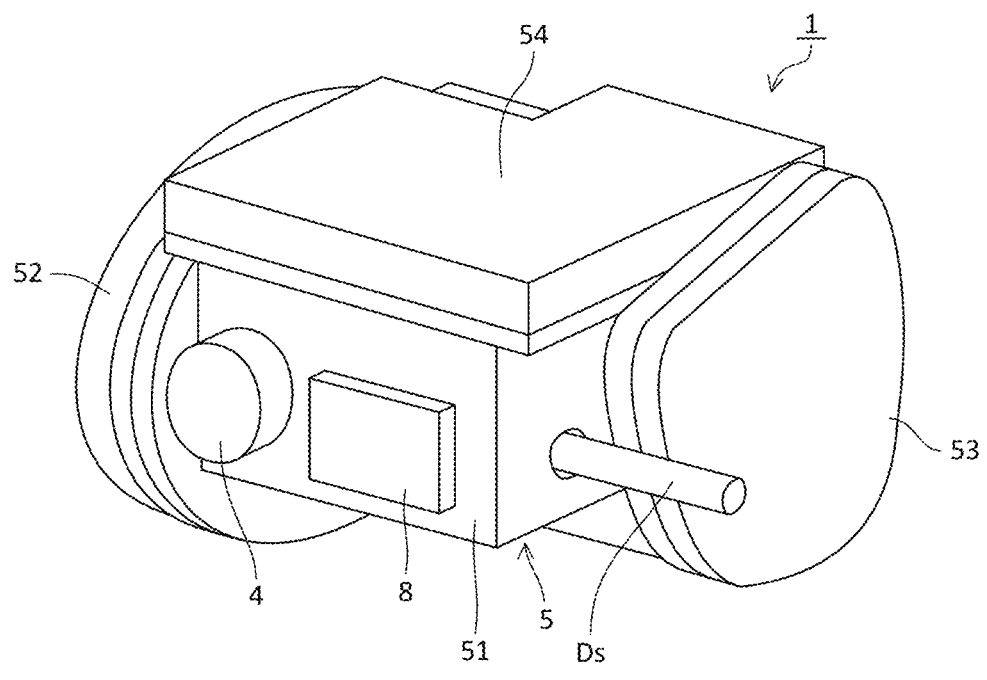
FIG. 4 is a perspective view of the drive device according to an example embodiment of the present disclosure.

The drive device 1 according to an example embodiment of the present disclosure will be described below with reference to the drawings. FIGS. 1 to 3 are conceptual views of the drive device 1 according to an example embodiment. FIG. 1 is a schematic configuration view of the drive device 1 viewed from a Z axis direction. FIG. 2 is a schematic configuration view of the drive device 1 viewed from the X axis direction. FIG. 3 is a schematic configuration view of the drive device 1 viewed from the Y axis direction. FIG. 4 is a perspective view of the drive device 1. Note that FIGS. 1 to 4 are merely conceptual views, and the layout and dimensions of each portion are not necessarily the same as those of the actual drive device 1.

The drive device 1 is mounted on the vehicle 200 (e.g., see FIG. 8 described later) using at least a motor as a power source, such as a hybrid vehicle (HV), a plug-in hybrid vehicle (PHV), and an electric vehicle (EV). The drive device 1 is used as the power source of the above-described vehicle 200.

As shown in FIG. 1, the drive device 1 includes the motor 2, a gear portion 3, a pump 4, a housing 5, an inverter 7, and an oil cooler 8. As shown in FIG. 1, the motor 2 has a motor shaft 22. The motor shaft 22 extends in the horizontal direction. The gear portion 3 is connected to the +Y direction-side end portion of the motor shaft 22. The housing 5 accommodates the motor 2, the gear portion 3, and the inverter 7. The pump 4 supplies an oil CL accommodated in the housing 5 to the motor 2. The oil cooler 8 cools the oil CL. The oil cooler 8 cools the oil CL supplied from the pump 4 to the motor 2 in the present example embodiment. The inverter 7 supplies drive electric power to the motor 2.

The inside of the housing 5 is provided with an accommodation space that accommodates the motor 2, the gear portion 3, the pump 4, and the inverter 7. As described later, this accommodation space is partitioned into a motor accommodation portion 61 that accommodates the motor 2, a gear accommodation portion 62 that accommodates the gear portion 3, an inverter accommodation portion 63 that accommodates the inverter 7, and a pump accommodation portion 64 that accommodates the pump 4. The inverter 7 is integrally attached to a fourth housing member 54 described later.

The motor 2 is accommodated in the motor accommodation portion 61 of the housing 5. The motor 2 includes the rotor 21 and the stator 25.

When electric power is supplied from a battery (not illustrated) to the stator 25, the rotor 21 rotates about the rotation axis J2 extending in the horizontal direction. The rotor 21 has the motor shaft 22. The rotor 21 includes a rotor core 23 and a rotor magnet 24. The rotor core 23 is fixed to the radial outward surface of the motor shaft 22.

The motor shaft 22 extends about the rotation axis J2 extending in the Y axis direction. The motor shaft 22 is rotatable about the rotation axis J2 extending along the Y axis direction. The motor shaft 22 is rotatably supported by a first motor bearing 281 and a second motor bearing 282. The first motor bearing 281 is held by a third housing member 53 of the housing 5 described later. The second motor bearing 282 is held by a side plate portion 512 of the housing 5 described later.

The motor shaft 22 is a tubular hollow shaft. The motor shaft 22 includes a hollow portion 220, a shaft tubular portion 221 extending in the Y axis direction, and a shaft hole portion 222. The hollow portion 220 is disposed inside the shaft tubular portion 221. The shaft hole portion 222 penetrates the shaft tubular portion 221 in the radial direction. The motor shaft 22 further includes a recess portion 223. The recess portion 223 is disposed on the inner circumferential surface of the shaft tubular portion 221 at the central portion of the rotation axis J2, is recessed radially outward from this inner circumferential surface, and extends in the circumferential direction. The shaft hole portion 222 is disposed in the bottom surface of the recess portion 223 and penetrates the shaft tubular portion 221 radially outward from the bottom surface of the recess portion 223.

A hollow transmission shaft 310 of the gear portion 3 described later is inserted and connected to one end portion (+Y side) of the motor shaft 22. In the present example embodiment, the both are connected by spline fitting. It is also possible to adopt a screw coupling using a male screw and a female screw for connecting the both. Alternatively, the both may be joined by a fixing method such as welding. The hollow portion 220 of the motor shaft 22 communicates with a hollow portion 310a of the transmission shaft 310 described later and a first motor bearing holding portion 531 that accommodates the first motor bearing 281.

The rotor core 23 is a columnar body extending along the Y axis direction. The rotor core 23 is disposed on the radial outward surface of the motor shaft 22. As mentioned earlier, the rotor 21 has the rotor core 23. A plurality of rotor magnets 24 are fixed to the rotor core 23. The plurality of rotor magnets 24 are aligned along the circumferential direction with the magnetic poles arranged alternately.

The rotor core 23 includes a rotor core through hole 230 and a rotor space 2334. The rotor core through hole 230 penetrates the rotor core 23 in the Y axis direction. The rotor space 2334 connects the rotor core through hole 230 and the shaft hole portion 222 of the motor shaft 22. The rotor core through hole 230 is used as a circulation path for the oil CL that cools the rotor 21 from inside. The oil CL circulating through the hollow portion 220 of the motor shaft 22 can flow into the rotor core through hole 230 via the shaft hole portion 222 and the rotor space 2334 as described later.

Figure 5:
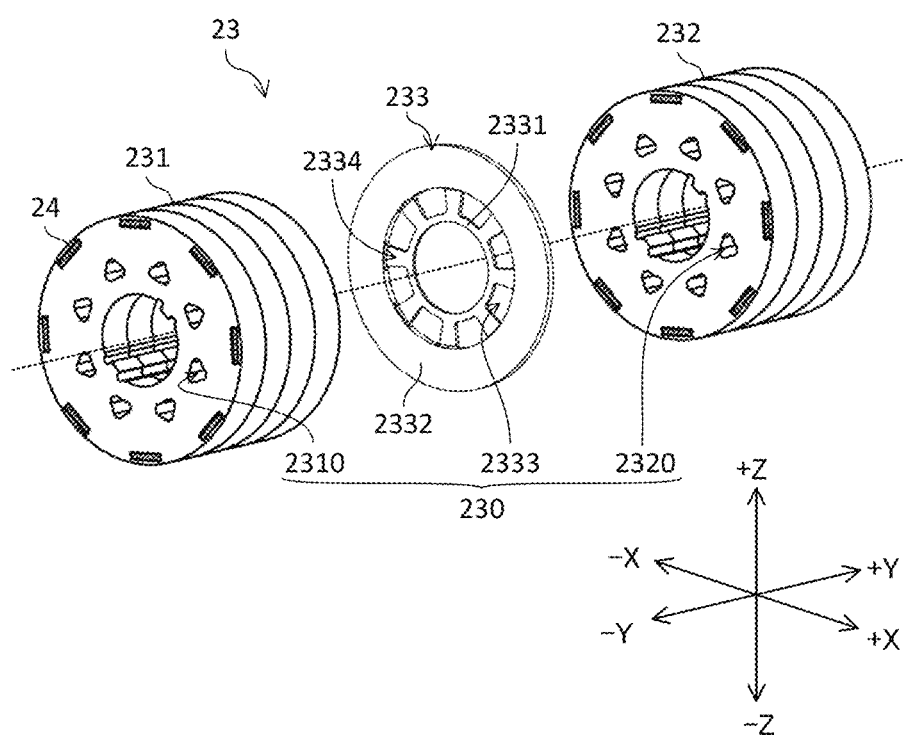
FIG. 5 is a perspective view showing a configuration example of a rotor core according to an example embodiment of the present disclosure.

FIG. 5 is a perspective view showing a configuration example of the rotor core 23. The rotor core 23 includes a first rotor core 231, a second rotor core 232, and an intermediate core 233. The first rotor core 231 has a first rotor core through hole 2310 extending in the Y axis direction. The second rotor core 232 has a second rotor core through hole 2320 extending in the Y axis direction. The intermediate core 233 is disposed between the first rotor core 231 and the second rotor core 232 in the Y axis direction. The first rotor core 231 and the second rotor core 232 are stacked bodies formed of stacked silicon steel plates. The intermediate core 233 is a silicon steel plate stacked between the first rotor core 231 and the second rotor core 232.

The intermediate core 233 includes an annular first annular portion 2331, an annular second annular portion 2332, and a core opening 2333. The first annular portion 2331 is disposed radially outward of the motor shaft 22. The second annular portion 2332 extends radially outward from the radially outer end portion of the first annular portion 2331. The core opening 2333 penetrates the first annular portion 2331 in the Y axis direction. In the present example embodiment, a plurality of the core openings 2333 are disposed in the circumferential direction along the radially inner end portion of the first annular portion 2331.

In the Y axis direction, the thickness of the second annular portion 2332 is greater than the thickness of the first annular portion 2331. Therefore, in the present example embodiment, the rotor space 2334 is disposed between the first annular portion 2331 and the first rotor core 231. However, the present disclosure is not limited to this example, and the rotor space 2334 may be disposed between the first annular portion 2331 and the second rotor core 232, or may be disposed both between the first annular portion 2331 and the first rotor core 231 and between the first annular portion 2331 and the second rotor core 232. That is, the rotor space 2334 can be disposed between the first annular portion 2331 and at least one of the first rotor core 231 and the second rotor core 232.

The rotor core through hole 230 includes the first rotor core through hole 2310, the second rotor core through hole 2320, and the core opening 2333. When viewed from the Y axis direction, the core opening 2333 overlaps at least a part of the first rotor core through hole 2310 and at least a part of the second rotor core through hole 2320. Accordingly, by appropriately adjusting the area where the core opening 2333 and the first rotor core through hole 2310 overlap each other viewed from the Y axis direction and the area where the core opening 2333 and the second rotor core through hole 2320 overlap each other viewed from the Y axis direction, it is possible to adjust the supply amount of the oil CL (see FIG. 1) supplied from the Y axial end portion of the rotor core through hole 230 to the Y axial end portion of the stator 25 during rotation of the rotor 21. For example, by preventing the excessive oil CL from being supplied to the Y axial end portion of the stator 25, the oil CL can hardly enter between the radial outward surface of the rotor 21 and the radial inward surface of the stator 25 from between the Y axial end portions of the rotor 21 and the stator 25. Therefore, it is possible to suppress or prevent a decrease in the rotation efficiency of the rotor 21 due to frictional resistance of the oil CL entered between the both.

The stator 25 rotationally drives the rotor 21. The stator 25 is disposed radially outward of the rotor 21 and surrounds the rotor 21 from radially outward. That is, the motor 2 is an inner rotor type motor in which the rotor 21 is rotatably disposed inside the stator 25. The stator 25 includes a stator core 26, a coil 27, and an insulator (not illustrated) interposed between the stator core 26 and the coil 27. The stator 25 is held by the housing 5. The stator core 26 has a plurality of magnetic pole teeth (reference numerals not shown) radially inward from an inner circumferential surface of an annular yoke.

A coil wire is wound between the magnetic pole teeth. The coil wire wound around the magnetic pole teeth constitutes the coil 27. The coil wire is connected to the inverter 7 via a bus bar not illustrated. The coil 27 includes a coil end 271 protruding from the axial end surface of the Y axis direction of the stator core 26. The coil end 271 protrudes in the Y axis direction relative to the end portion of the rotor core 23 of the rotor 21.

Next, the gear portion 3 transmits drive force to a drive shaft Ds. The drive shaft Ds transmits drive force of the motor 2 to the wheels of the vehicle 200. The drive device 1 mounted on the vehicle 200 includes the drive shaft Ds of the vehicle 200. Details of the gear portion 3 will be described with reference to the drawings. As shown in FIG. 1 and the like, the gear portion is accommodated in the gear accommodation portion 62 of the housing 5. The gear portion 3 includes a deceleration device 31 and a differential device 32.

The deceleration device 31 is connected to the motor shaft 22. The deceleration device 31 reduces the rotational speed of the motor 2, increases the torque output from the motor 2 according to the reduction ratio, and transmits the increased torque to the differential device 32.

The deceleration device 31 includes the transmission shaft 310, a first gear (intermediate drive gear) 311, a second gear (intermediate gear) 312, a third gear (final drive gear) 313, and an intermediate shaft 314. The torque output from the motor 2 is transmitted to a fourth gear 321 of the differential device 32 via the motor shaft 22, the transmission shaft 310, the first gear 311, the second gear 312, the intermediate shaft 314, and the third gear 313. The gear ratio of each gear, the number of gears, and the like can be variously changed according to the required reduction ratio. The deceleration device 31 is a parallel axis gear type deceleration device in which the axis centers of the gears are disposed in parallel. The motor shaft 22 and the transmission shaft 310 are spline-fitted.

The transmission shaft 310 extends in the Y axis direction about the rotation axis J2 and rotates about the rotation axis J2 together with the motor shaft 22. The motor shaft 22 is rotatably supported by a first gear bearing 341 and a second gear bearing 342. As described later, the first gear bearing 341 is held by the side plate portion 512 of the housing 5. The second gear bearing 342 is held by a second housing member 52 described later.

The transmission shaft 310 is a hollow shaft provided with the hollow portion 310a having an inner circumferential surface extending along the rotation axis J2 inside thereof. The −Y direction-side end portion of the transmission shaft 310 is connected to the +Y direction-side end portion of the motor shaft 22 as mentioned earlier. Note that the present disclosure is not limited to the example of the present example embodiment, and the transmission shaft 310 may be the same member as the motor shaft 22, that is, may be integrated. In other words, the motor shaft 22 may be a hollow shaft extending across the motor accommodation portion 61 and the gear accommodation portion 62 of the housing 5. In this case, the +Y direction-side end portion of the motor shaft 22 protrudes on the gear accommodation portion 62 side and is rotatably supported by the second gear bearing 342. The hollow portion 220 of the motor shaft 22 communicates with the first motor bearing holding portion 531 that accommodates the first motor bearing 281 and the second gear bearing holding portion 521 that accommodates the second gear bearing 342.

The first gear 311 is provided on the outer circumferential surface of the transmission shaft 310. The first gear 311 may be the same member as or a different member from the transmission shaft 310. When the first gear 311 and the transmission shaft 310 are separate members, the first gear 311 and the transmission shaft 310 are firmly fixed by shrink fitting or the like. The first gear 311 is rotatable about the rotation axis J2 together with the transmission shaft 310.

The intermediate shaft 314 extends along an intermediate axis J4 parallel to the rotation axis J2 and is rotatably supported by the housing 5 about the intermediate axis J4. Both ends of the intermediate shaft 314 are rotatably supported by a third gear bearing 343 and a fourth gear bearing 344. The third gear bearing 343 is held by the side plate portion 512 of the housing 5. The fourth gear bearing 344 is held by the second housing member 52.

The second gear 312 and the third gear 313 are provided on the outer circumferential surface of the intermediate shaft 314. The second gear 312 and the third gear 313 may be the same members as or different members from the intermediate shaft 314. When the second gear 312 and the intermediate shaft 314 are separate members, they are firmly fixed by shrink fitting or the like. When the third gear 313 and the intermediate shaft 314 are separate members, they are firmly fixed by shrink fitting or the like. The third gear 313 is disposed closer to the side plate portion 512 than the second gear 312 (i.e., in the −Y direction).

The second gear 312 and the third gear 313 are connected to each other with the intermediate shaft 314 interposed therebetween. The second gear 312 and the third gear 313 are rotatable about the intermediate axis J4. The second gear 312 meshes with the first gear 311. The third gear 313 meshes with the fourth gear 321 of the differential device 32.

The torque of the transmission shaft 310 is transmitted from the first gear 311 to the second gear 312. The torque transmitted to the second gear 312 is transmitted to the third gear 313 via the intermediate shaft 314. The torque transmitted to the third gear 313 is transmitted to the fourth gear 321 of the differential device 32. In this manner, the deceleration device 31 transmits, to the differential device 32, the torque output from the motor 2.

The differential device 32 is attached to the drive shaft Ds. The differential device 32 transmits the output torque of the motor 2 to the drive shaft Ds. The drive shaft Ds is attached to each of the right and left sides of the differential device 32. The differential device 32 has a function of transmitting the same torque to the right and left drive shafts Ds while absorbing a speed difference between the right and left wheels (drive shaft Ds) when the vehicle 200 turns, for example. The differential device 32 includes, for example, the fourth gear (ring gear) 321, a gear housing (not illustrated), a pair of pinion gears (not illustrated), a pinion shaft (not illustrated), and a pair of side gears (not illustrated).

The fourth gear 321 is rotatable about the drive shaft Ds extending along a differential axis J5 parallel to the rotation axis J2. Torque output from the motor 2 is transmitted to the fourth gear 321 via the deceleration device 31.

Next, the pump 4 is an electric pump driven by electricity, and is connected to the inverter 7 via a harness cable (not illustrated). That is, the pump 4 is driven by the inverter 7. As the pump 4, a trochoidal pump, a centrifugal pump, or the like can be employed. The pump 4 is provided in the pump accommodation portion 64 formed in the housing 5. In the present example embodiment, the pump accommodation portion 64 is a recess portion that is recessed in the +X direction from the −X direction-side end portion of a peripheral wall portion 514. For example, the pump 4 is fixed to the housing 5 with a bolt (not illustrated).

A suction port 41 of the pump 4 is inserted into a first oil passage 551 so as to close the first oil passage 551. The suction port 41 of the pump 4 is connected to a strainer 42 via the first oil passage 551 described later. The strainer 42 is disposed in the gear accommodation portion 62 of the housing 5. The strainer 42 is located in an oil pool P (see FIG. 2 and the like) of the gear accommodation portion 62 described later. The strainer 42 sucks the oil CL by drive of the pump 4 from an inlet (not illustrated) disposed on the −Z direction-side end surface thereof and supplies the oil CL to the suction port 41 of the pump 4. A filtration structure (not illustrated) such as a filter is attached to the strainer 42. By attaching the filtration structure, it is possible to suppress mixing of foreign matters into the pump 4 and mixing of foreign matters into the motor 2.

A discharge port 43 of the pump 4 opens to the pump accommodation portion 64. That is, the oil CL protruding from the pump 4 fills the pump accommodation portion 64. A second oil passage 552 described later is connected to the pump accommodation portion 64. The pump 4 discharges the oil CL sucked from the suction port 41 from the discharge port 43 and sends the oil CL to the oil cooler 8 via the second oil passage 552.

The oil cooler 8 performs heat exchange between the oil CL sent from the pump 4 via the second oil passage 552 and a refrigerant RE flowing through a pipe 56 of a system different from an oil passage 55 described later including the second oil passage 552. Thus, the oil cooler 8 cools the oil CL sent from the pump 4. The oil CL cooled by the oil cooler 8 is supplied to the motor 2 via a third oil passage 553 and a fourth oil passage 554 described later. The refrigerant RE is supplied to the oil cooler 8 after cooling an IGBT, an SIC element, and the like (not illustrated) of the inverter 7. In the present example embodiment, the oil cooler 8 is disposed on the −Y direction side with respect to the pump 4 and the pump accommodation portion 64.

Figure 6:
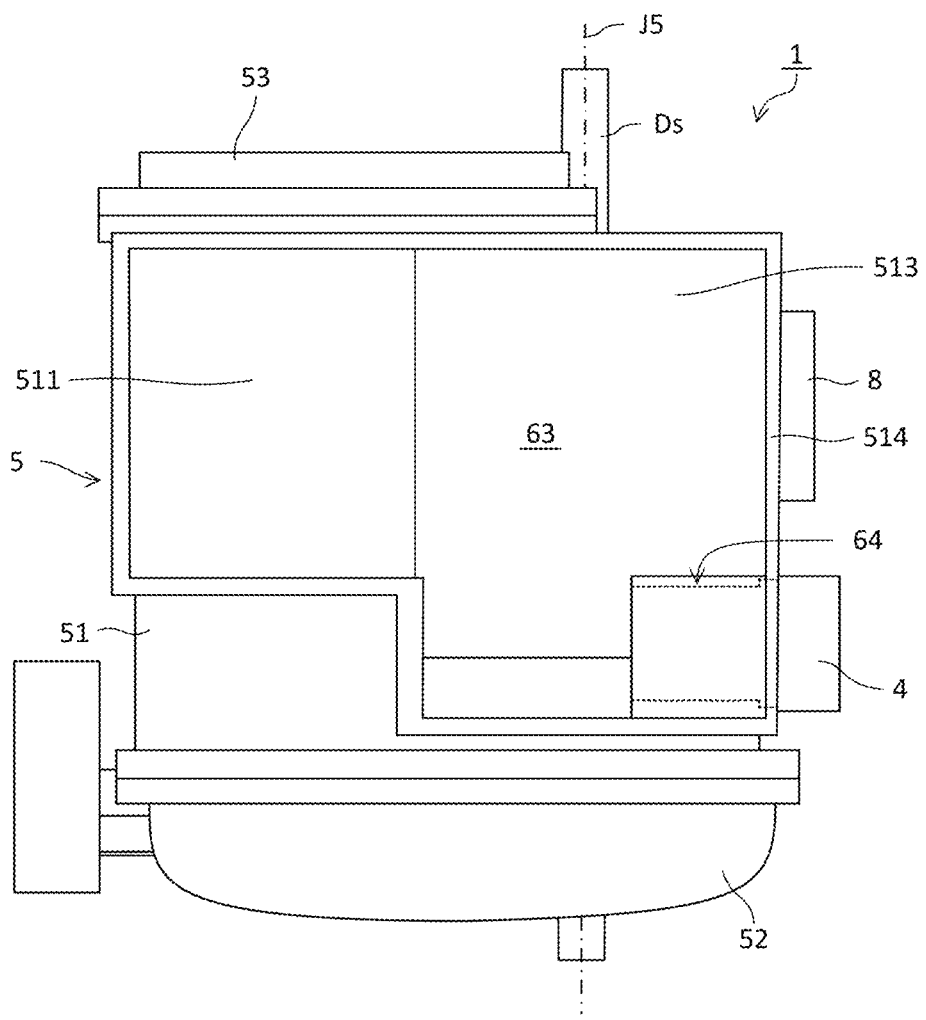
FIG. 6 is a top view of an inverter accommodation portion according to an example embodiment of the present disclosure viewed from the +Z direction to the −Z direction.
Figure 6:
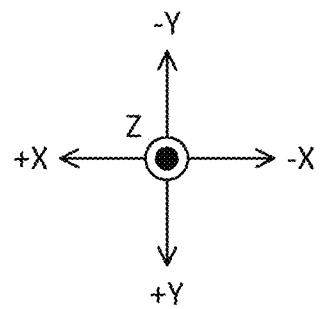

The pump accommodation portion 64 is formed in the peripheral wall portion 514 described later surrounding the inverter accommodation portion 63 (see FIG. 6). For example, the pump accommodation portion 64 can be disposed using a dead space other than the space occupied by the inverter 7 in the inverter accommodation portion 63. This allows the pump 4 to be compactly disposed, which can contribute to downsizing of the drive device 1.

Preferably, in the Z axis direction, the pump 4 is disposed in the −Z direction with respect to the fourth housing member 54 and in the +Z direction with respect to the drive shaft Ds. Thus, the pump 4 can be disposed in an empty space between the drive shaft Ds and the fourth housing member 54 in the Z axis direction. Therefore, it is possible to contribute to downsizing of the drive device 1 in the Z axis direction. Furthermore, there is no interference with an attachment portion 510 to the vehicle 200 provided in the first housing member 51.

In the X axis direction perpendicular to the Y axis direction and the Z axis direction, the pump 4 and the oil cooler 8 are disposed at one end portion of the housing 5 in the front-rear direction. The motor accommodation portion 61 is disposed at a portion on the other side in the front-rear direction of the housing 5. For example, in the present example embodiment, the pump 4 and the oil cooler 8 are disposed at the rear end portion (i.e., the −X direction-side end portion) of the housing 5, and the motor accommodation portion 61 is disposed at the front portion (i.e., the +X direction side) of the housing 5. In this case, the pump 4 and the oil cooler 8 are disposed at the end portions in the front-rear direction, and it is therefore possible to suppress an increase in size of the drive device 1 in the Y axis direction. In addition, the pump 4 and the oil cooler 8 are provided on the housing 5 on the side opposite to the motor accommodation portion 61 in the front-rear direction, and thus the pump 4 and the oil cooler 8 can be disposed away from the motor accommodation portion 61. Therefore, the pump 4 and the oil cooler 8 can be disposed without greatly increasing the size of the drive device 1 in the front-rear direction. Furthermore, an oil passage or the like can be relatively freely disposed between the pump 4 and the oil cooler 8 and the motor accommodation portion 61.

Figure 7:
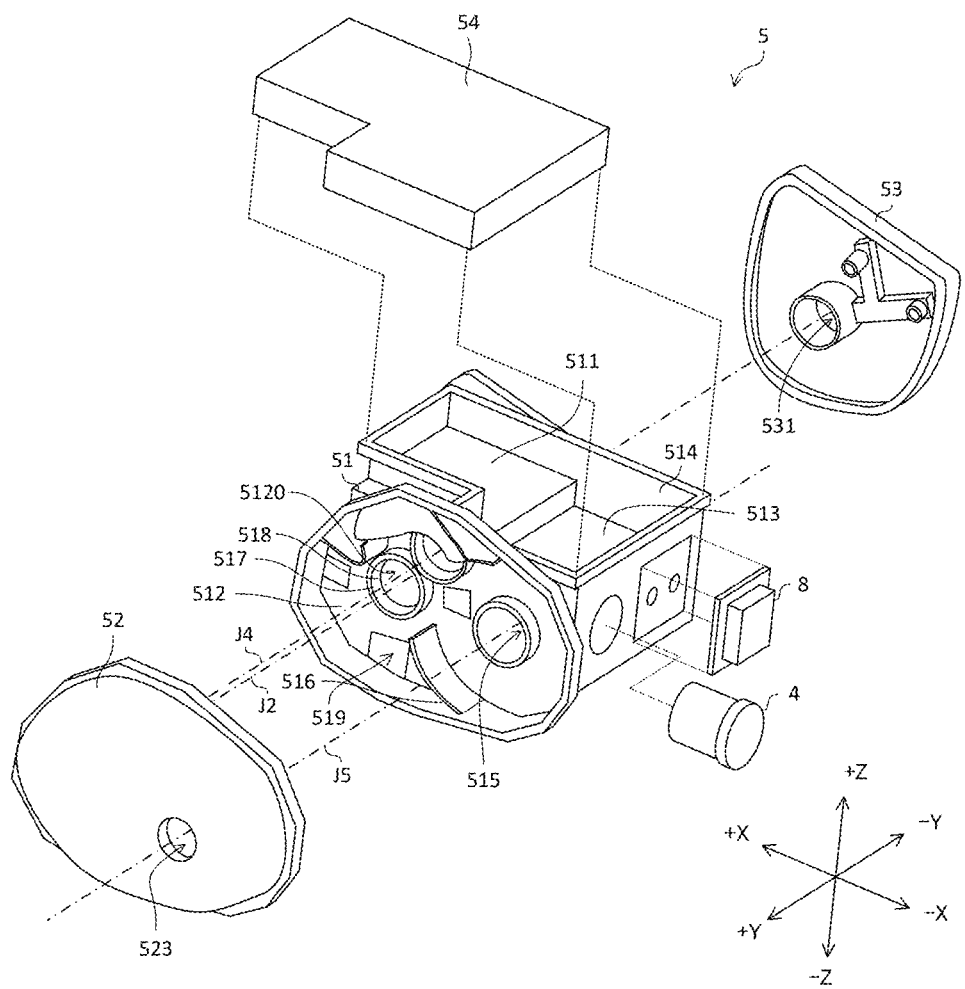
FIG. 7 is an exploded perspective view of a housing according to an example embodiment of the present disclosure.

Next, the configuration of the housing 5 will be described. FIG. 7 is an exploded view of the housing 5. As shown in FIG. 7, the housing 5 includes a first housing member 51, a second housing member 52, and a third housing member 53. The first housing member 51 includes a tubular portion 511 extending in the Y axis direction parallel to the rotation axis J2 and the side plate portion 512 covering one Y axial end portion of the tubular portion 511. The second housing member 52 is attached to the +Y direction-side end portion of the side plate portion 512. The third housing member 53 closes the −Y direction-side end portion of the tubular portion 511. In other words, the third housing member 53 is disposed at the −Y direction-side end portion of the first housing member 51. That is, the third housing member 53 closes the opening of the tubular first housing member 51.

The housing 5 further includes the fourth housing member 54. The fourth housing member 54 is located in the +Z direction with respect to the first housing member 51, and specifically, is disposed in the +Z direction with respect to the tubular portion 511. The fourth housing member 54 is attached to the +Y direction-side end portion of the peripheral wall portion 514.

The housing 5 further includes the motor accommodation portion 61 that accommodates the motor 2 and the gear accommodation portion 62 accommodates the gear portion 3. The motor accommodation portion 61 is a space surrounded by the tubular portion 511, the side plate portion 512, and the third housing member 53. The gear accommodation portion 62 is a space surrounded by the side plate portion 512 and the second housing member 52. The motor accommodation portion 61 and the gear accommodation portion 62 are partitioned by the side plate portion 512.

The housing 5 further includes the inverter accommodation portion 63 that accommodates the inverter 7. The inverter accommodation portion 63 is a space surrounded by the tubular portion 511, the plate portion 513, the peripheral wall portion 514, and the fourth housing member 54. The inverter 7 is integrally fixed to the fourth housing member 54. That is, the inverter 7 is fixed downward to the inverter accommodation portion 63 by integrally fixing the inverter 7 to the lower side of the fourth housing member 54. The fourth housing member 54 may be provided with an inverter cooling path (not illustrated).

The housing 5 further includes the pump accommodation portion 64 that accommodates the pump 4. The pump accommodation portion 64 is formed in the first housing member 51. That is, the first housing member 51 includes the pump accommodation portion 64. In the present example embodiment, the pump accommodation portion 64 is a recess portion that is recessed in the +X direction from the −X direction-side end portion of a peripheral wall portion 514.

The tubular portion 511 has a tubular shape extending in the Y axis direction. As mentioned earlier, the housing 5 has the tubular portion 511. The tubular portion 511 accommodates the motor 2. That is, the space inside the tubular portion 511 constitutes the motor accommodation portion 61. In the present example embodiment, the tubular portion 511 and the side plate portion 512 are the identical member. However, the present disclosure is not limited to this example, and the tubular portion 511 and the side plate portion 512 may be different members.

The side plate portion 512 has a plate shape intersecting the Y axis direction. In the present example embodiment, the side plate portion 512 expands perpendicularly with the Y axis direction. The housing 5 has the side plate portion 512. The side plate portion 512 is disposed at the +Y direction-side end portion of the tubular portion 511 and covers the +Y direction-side end portion of the tubular portion 511.

The first housing member 51 further includes the plate portion 513 and the peripheral wall portion 514. The plate portion 513 expands from the tubular portion 511 along the +X direction perpendicular to the Y axis direction. The housing 5 has the plate portion 513. The peripheral wall portion 514 protrudes in the +Z direction from the +Z direction-side end portion of the tubular portion 511 and the plate portion 513. The peripheral wall portion 514 surrounds the inverter accommodation portion 63 when viewed from the Y axis direction and the X axis direction (see FIG. 6) and is connected to the plate portion 513. The housing 5 has the peripheral wall portion 514.

The first housing member 51 further includes an insertion hole 5120, a first drive shaft passage hole 515, a second motor bearing holding portion 516, a first gear bearing holding portion 517, a third gear bearing holding portion 518, and a side plate opening 519.

The insertion hole 5120 is disposed in the side plate portion 512 and penetrates the side plate portion 512 in the Y axis direction. The center of the insertion hole 5120 coincides with the rotation axis J2. The second motor bearing holding portion 516 is disposed in the insertion hole 5120.

The first drive shaft passage hole 515 is disposed in the side plate portion 512 and penetrates the side plate portion 512 in the Y axis direction. The side plate portion 512 has the first drive shaft passage hole 515. The drive shaft Ds extending along the Y axis direction is inserted into the first drive shaft passage hole 515. A second drive shaft passage hole 523 is disposed in the second housing member 52. The second drive shaft passage hole 523 is a hole penetrating the second housing member 52 in the Y axis direction. The drive shaft Ds penetrates the second drive shaft passage hole 523 in a rotatable state. The second drive shaft passage hole 523 overlaps the first drive shaft passage hole 515 when viewed from the Y axis direction. Consequently, the drive shaft Ds disposed at both ends in the Y axis direction of the differential device 32 rotates about the differential axis J5. An oil seal (not illustrated) is provided between the drive shaft Ds and the first drive shaft passage hole 515 and between the drive shaft Ds and the second drive shaft passage hole 523 in order to suppress leakage of the oil CL. An axle (not illustrated) that rotates the wheel is connected to a front end of the drive shaft Ds.

The second motor bearing holding portion 516 extends in the −Y direction from the edge portion of the insertion hole 5120. An outer ring of the second motor bearing 282 is fixed to the second motor bearing holding portion 516. The +Y direction-side end portion of the motor shaft 22 is fixed to the inner ring of the second motor bearing 282. The first motor bearing holding portion 531 is disposed on the +Y direction side of the third housing member 53. The central axes of the first motor bearing holding portion 531 and the second motor bearing holding portion 516 each coincide with the rotation axis J2. An outer ring of the first motor bearing 281 is fixed to the first motor bearing holding portion 531. The −Y direction-side end portion of the motor shaft 22 is fixed to the inner ring of the first motor bearing 281. As a result, both ends of the rotor 21 in the Y axis direction of the motor 2 are rotatably supported by the housing 5 via the first motor bearing 281 and the second motor bearing 282.

The first gear bearing holding portion 517 extends in the +Y direction from the edge portion of the insertion hole 5120. An outer ring of the first gear bearing 341 is fixed to the first gear bearing holding portion 517. The −Y direction-side end portion of the transmission shaft 310 is fixed to the inner ring of the first gear bearing 341. The second gear bearing holding portion 521 is disposed on the −Y direction side of the second housing member 52. The central axes of the second gear bearing holding portion 521 and the first gear bearing holding portion 517 coincide with the rotation axis J2. An outer ring of the second gear bearing 342 is fixed to the second gear bearing holding portion 521. The transmission shaft 310 is fixed to the inner ring of the second gear bearing 342. As a result, the transmission shaft 310 is rotatably supported by the side plate portion 512 of the housing 5 and the second housing member 52 via the first gear bearing 341 and the second gear bearing 342.

Next, the third gear bearing holding portion 518 has a tubular shape extending in the +Y direction from the side plate portion 512. The third gear bearing holding portion 518 is disposed in the +X direction and the +Z direction with respect to the first gear bearing holding portion 517. An outer ring of the third gear bearing 343 is fixed to the third gear bearing holding portion 518. The intermediate shaft 314 is fixed to the inner ring of the third gear bearing 343. The fourth gear bearing holding portion 522 is disposed on the +Y direction side of the second housing member 52. The fourth gear bearing holding portion 522 has a tubular shape extending in the −Y direction from the second housing member 52. The central axes of the third gear bearing holding portion 518 and the fourth gear bearing holding portion 522 coincide with the intermediate axis J4. An outer ring of the fourth gear bearing 344 is fixed to the fourth gear bearing holding portion 522. The +Y direction-side end portion of the intermediate shaft 314 is fixed to the inner ring of the fourth gear bearing 344. As a result, the intermediate shaft 314 is rotatably supported by the side plate portion 512 of the housing 5 and the second housing member 52 via the third gear bearing 343 and the fourth gear bearing 344.

The side plate opening 519 is provided in the side plate portion 512 that partitions the motor accommodation portion 61 and the gear accommodation portion 62. The housing 5 includes the side plate opening 519. The side plate opening 519 penetrates the side plate portion 512 in the Y axis direction and connects the motor accommodation portion 61 and the gear accommodation portion 62. The side plate opening 519 causes in particular the lower portion of the motor accommodation portion 61 and the lower portion of the gear accommodation portion 62 to communicate with each other. The side plate opening 519 allows the oil CL accumulated in the lower portion in the motor accommodation portion 61 to move to the gear accommodation portion 62. The oil CL having moved to the gear accommodation portion 62 can flow into the oil pool P.

Next, the configuration of the second housing member 52 will be described. The second housing member 52 is attached to the +Y direction side plate portion 512 side of the first housing member 51. The second housing member 52 has a recessed shape that is open to the side plate portion 512 side. The opening of the second housing member 52 is covered with the side plate portion 512. As shown in FIG. 1 and the like, the second housing member 52 includes the second gear bearing holding portion 521, the fourth gear bearing holding portion 522, and the second drive shaft passage hole 523. Since these descriptions have been made previously, they are omitted here.

The second housing member 52 may include an oil storage portion (not illustrated) that stores the oil CL. The oil CL is supplied from the oil storage portion not illustrated to the second gear bearing holding portion 521 and the fourth gear bearing holding portion 522, and the oil CL is supplied to the second gear bearing 342 held by the second gear bearing holding portion 521 and the fourth gear bearing 344 held by the fourth gear bearing holding portion 522 for lubrication.

The oil pool P in which the oil CL accumulates is disposed in a lower portion in the gear accommodation portion 62. A part of the differential device 32 is immersed in the oil pool P. The oil CL accumulated in the oil pool P is scraped up by the operation of the differential device 32, and supplied to the inside of the gear accommodation portion 62. For example, the oil CL is scraped up by the tooth surface of the fourth gear 321 when the fourth gear 321 of the differential device 32 rotates. The oil CL diffused in the gear accommodation portion 62 is supplied to each gear of the deceleration device 31 and the differential device 32 in the gear accommodation portion 62 to spread the oil CL over the tooth surface of the gear, and used for lubrication. A part of the oil CL diffused in the gear accommodation portion 62 is supplied to each of the first gear bearing 341 to the fourth gear bearing 344, and used for lubrication.

Next, for example, as shown in FIGS. 1 to 3, the housing 5 further includes the oil passage 55 through which the oil CL flows. The oil passage 55 is a flow path through which the oil CL sucked up from the oil pool P of the gear accommodation portion 62 by the pump 4 and cooled by the oil cooler 8 flows toward the motor 2.

The oil passage 55 includes the first oil passage 551, the second oil passage 552, the third oil passage 553, and the fourth oil passage 554. The first oil passage 551, the second oil passage 552, and the third oil passage 553 are formed in the first housing member 51. The first oil passage 551 connects a lower portion of the gear accommodation portion 62 in the Z axis direction and the pump accommodation portion 64. That is, the first oil passage 551 connects the oil pool P and the suction port 41 of the pump 4. The second oil passage 552 connects the pump accommodation portion 64 and the oil cooler 8. The third oil passage 553 connects the oil cooler 8 and the fourth oil passage 554. That is, the third oil passage 553 supplies the oil CL discharged from the pump 4 to the oil cooler 8. The fourth oil passage 554 is formed in the third housing member 53. The fourth oil passage 554 connects the third oil passage 553 and the motor accommodation portion 61.

Preferably, each of the first oil passage 551, the second oil passage 552, and the third oil passage 553 is formed in the first housing member 51. For example, in the present example embodiment, the first oil passage 551 is formed inside the side plate portion 512, that is, formed at a different position of the same member as the side plate portion 512. Each of the second oil passage 552 and the third oil passage 553 is formed inside the peripheral wall portion 514, that is, formed at different positions of the same member as the peripheral wall portion 514. The fourth oil passage 554 is formed in the third housing member 53, and is preferably disposed in the third housing member 53. Accordingly, it is not necessary to dispose a pipe through which the oil CL flows outside the housing 5, and thus it is possible to prevent an increase in size of the drive device 1. Therefore, it is possible to provide the drive device 1 in which the oil passage 55 of the oil CL is compactly disposed. Each of the first oil passage 551 to the fourth oil passage 554 is drilled by a drill or an end mill. The fourth oil passage 554 is not limited to the above example, and may be a member different from the third housing member 53, for example, may be a pipe disposed outside the third housing member 53.

The present disclosure is not limited to the example of the present example embodiment, and the second oil passage 552 and the third oil passage 553 may be formed inside the plate portion 513. That is, each of the second oil passage 552 and the third oil passage 553 may be the same member as either the plate portion 513 or the peripheral wall portion 514. Thus, the second oil passage 552 and the third oil passage 553 are not separate members from the first housing member 51, and hence the number of components of the drive device 1 can be reduced. Therefore, the drive device 1 becomes easy to assemble. Furthermore, the productivity can be improved by reduction of the manufacturing cost of the drive device 1.

Preferably, the oil passage 55 further includes a connection pipe 5530. The connection pipe 5530 is disposed on an inner surface of one oil passage of the third oil passage 553 and the fourth oil passage 554 at a connection portion between the third oil passage 553 and the fourth oil passage 554, and is fitted into the other oil passage. Due to the fitting of the connection pipe 5530 at the connection portion, the third oil passage 553 and the fourth oil passage 554 can be easily positioned when the third housing member 53 is attached to the first housing member 51. Furthermore, the connection pipe 5530 covers the inside of the connection portion between the both, whereby the leakage of the oil CL at the connection portion can be more reliably prevented.

For example, in the present example embodiment, in the connection portion described above, one end portion of the connection pipe 5530 is disposed on the inner surface of the third oil passage 553. The other end portion of the connection pipe 5530 is fitted into the inner surface of the fourth oil passage 554. The connection pipe 5530 is the same member as the third oil passage 553. Alternatively, one end portion of the connection pipe 5530 may be disposed on the inner surface of the fourth oil passage 554, and the other end portion may be fitted into the inner surface of the third oil passage 553. The connection pipe 5530 may be the same member as the fourth oil passage 554. However, the present disclosure is not limited to these examples, and the connection pipe 5530 may be a member different from the third oil passage 553 and the fourth oil passage 554.

Next, the fourth oil passage 554 is connected to an oil supply portion 558 and the hollow portion 220 of the motor shaft 22. The oil supply portion 558 is connected to the fourth oil passage 554 and supplies the oil CL to the radial outward surface of the stator 25. The drive device 1 further includes the oil supply portion 558. The oil supply portion 558 is accommodated in the tubular portion 511 and is disposed radially outward of the stator 25. Specifically, the oil supply portion 558 is a tubular member extending in the Y axis direction. The oil supply portion 558 is accommodated in the motor accommodation portion 61 together with the motor 2 and is disposed above the stator 25. The oil supply portion 558 has a plurality of dispersion holes 5580 penetrating the inner wall. Each of the dispersion holes 5580 opens toward the stator 25 and disperses the oil CL supplied from the fourth oil passage 554 toward the stator 25. Therefore, the stator 25 can be cooled from its radial outward surface by the oil CL supplied from the oil supply portion 558.

On the other hand, the hollow portion 220 of the motor shaft 22 is connected to the rotor core through hole 230 of the rotor core 23. For example, the hollow portion 220 of the motor shaft 22 is connected to the rotor core through hole 230 via the recess portion 223, the shaft hole portion 222, and the rotor space 2334 (see FIG. 5). That is, the rotor core through hole 230 is connected to the fourth oil passage 554 via the hollow portion 220. Therefore, when the rotor 21 rotates, the oil CL is supplied from the Y axial end portion of the rotor core through hole 230 to the Y axial end portion of the stator 25. Thus, the Y axial end portion of the stator 25 can be cooled by the oil CL supplied from the rotor core through hole 230, and in particular, the coil end of the stator 25 can be cooled.

The fourth oil passage 554 includes a first supply passage 555, a tubular second supply passage 556, and a tubular third supply passage 557. The first supply passage 555 is connected to the third oil passage 553. The second supply passage 556 connects the first supply passage 555 and the oil supply portion 558. The third supply passage 557 connects the first supply passage 555 and the hollow portion 220 of the motor shaft 22. That is, one end portion of the fourth oil passage 554 is the first supply passage 555, and the other end portion of the fourth oil passage 554 branches into the second supply passage 556 and the third supply passage 557. Preferably, the inner diameter of the second supply passage 556 is larger than the inner diameter of the third supply passage 557. Specifically, the minimum inner diameter of the second supply passage 556 is larger than the minimum inner diameter of the third supply passage 557. Thus, the amount of the oil CL supplied to the oil supply portion 558 can be made larger than the amount of the oil CL supplied to the hollow portion 220 of the motor shaft 22. Therefore, more oil CL can be supplied to the radial outward surface of the stator 25 than to the Y axial end portion of the stator 25 such as the coil end 271. Therefore, it is possible to improve the cooling efficiency of the stator 25 by the oil CL cooled by the oil cooler 8. The oil CL having cooled the motor 2 accumulates in the lower portion of the motor accommodation portion 61 and then flows to the oil pool P in the lower portion of the gear accommodation portion 62 through the side plate opening 519. That is, the oil CL supplied from the second supply passage 556 to the radial outward surface of the stator 25 via the oil supply portion 558 and having cooled the stator 25 accumulates in the lower portion of the motor accommodation portion 61, and then flows to the oil pool P in the lower portion of the gear accommodation portion 62 through the side plate opening 519. The oil CL supplied from the third supply passage 557 to the coil end 271 and the like via the rotor core through hole 230 accumulates in the lower portion of the motor accommodation portion 61, and then flows to the oil pool P in the lower portion of the gear accommodation portion 62 through the side plate opening 519.

More preferably, the inner diameter of the second supply passage 556 is larger than 1.6 times the inner diameter of the third supply passage 557. For example, in the present example embodiment, the inner diameter of the second supply passage 556 is φ7 mm, and the inner diameter of the third supply passage 557 is φ5.5 mm.

Note that the above-described example does not exclude a configuration in which the inner diameter of the second supply passage 556 is equal to or smaller than the inner diameter of the third supply passage 557.

Figure 8:
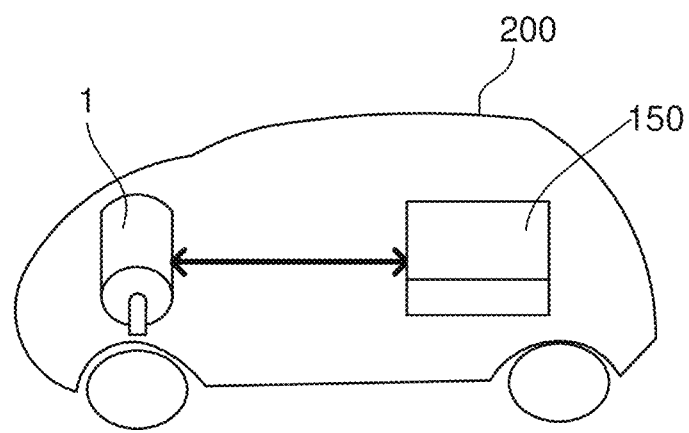
FIG. 8 is a schematic view showing an example of a vehicle having the drive device.

FIG. 8 is a schematic view showing an example of a vehicle 200 having the drive device 1. FIG. 8 conceptually illustrates the drive device 1. The vehicle 200 includes the drive device 1 and a battery 150. The battery 150 stores electric power to be supplied to the drive device 1. In the example of the vehicle 200, the drive device 1 drives the right and left front wheels. The drive device 1 is only required to drive at least any of the wheels. Such the vehicle 200 can be mounted with the drive device 1 in which the oil passage 55 of the oil CL is compactly disposed. This contributes to downsizing of the vehicle 200. Furthermore, since the drive device 1 can be disposed in a space-saving manner, it is possible to further expand the space in the vehicle that can be used by the passenger of the vehicle 200.

As described above, in the present example embodiment, each of the pump 4 and the oil cooler 8 is disposed at the −X direction-side end portion of the peripheral wall portion 514. The pump 4 is disposed in the +Y direction with respect to the oil cooler 8. However, the disposition of the pump 4 and the oil cooler 8 is not limited to the example of the present example embodiment. For example, the pump 4 may be disposed in the −Y direction with respect to the oil cooler 8. Each of the pump 4 and the oil cooler 8 may be disposed at the −Z direction-side end portion of the plate portion 513 or the −Y direction-side end portion of the side plate portion 512.

Hereinafter, first to fourth modifications of the disposition of the pump 4 and the oil cooler 8 will be described. Configurations different from those of the above-described example embodiment and other modifications will be described for each of the first to fourth modifications below. Moreover, components similar to those in the above example embodiments and other modifications are denoted by the same reference numerals, and a detailed description thereof will be omitted.

In addition, the above-described example embodiment and the first to fourth modifications can be appropriately combined and implemented as long as there is no particular contradiction.

Figure 9:
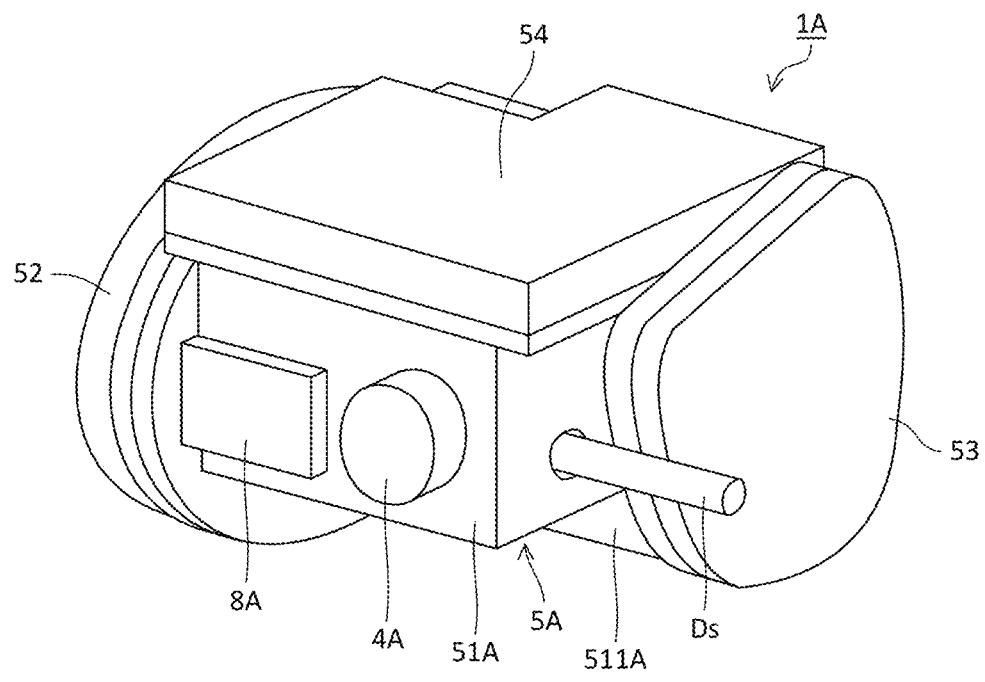
FIG. 9 is a perspective view showing an example of a drive device according to a first modification of an example embodiment of the present disclosure.
Figure 10:
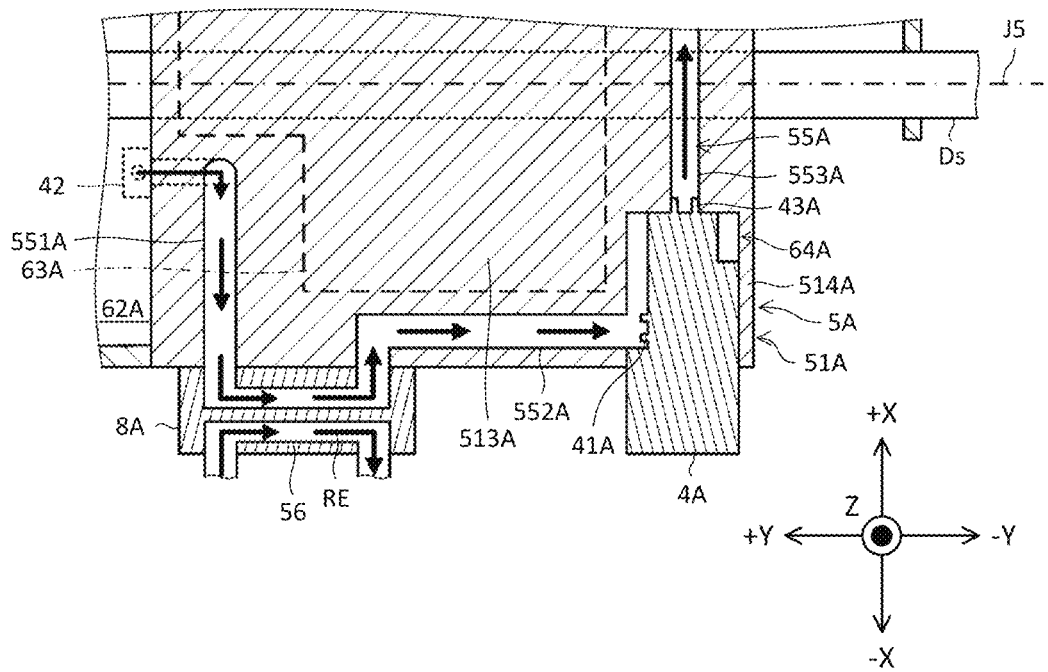
FIG. 10 is a schematic configuration view showing a disposition example of a first oil passage to a third oil passage according to the first modification when viewed from the Y axis direction.

First, the first modification of the disposition of a pump 4A and an oil cooler 8A will be described with reference to FIGS. 9 and 10. FIG. 9 is a perspective view showing an example of a drive device 1A according to the first modification. FIG. 10 is a schematic configuration view showing a disposition example of a first oil passage 551A to a third oil passage 553A according to the first modification when viewed from the Y axis direction.

The drive device 1A according to the first modification includes a housing 5A, the pump 4A, and the oil cooler 8A.

The housing 5A accommodates the motor 2 and the inverter (see, for example, FIG. 2). The housing 5A includes a gear accommodation portion 62A, an inverter accommodation portion 63A, a pump accommodation portion 64A, a tubular portion 511A, a plate portion 513A, and a peripheral wall portion 514A. The gear accommodation portion 62A accommodates the gear portion 3 (see FIG. 1). The inverter accommodation portion 63A accommodates the inverter 7 (see FIG. 2). The pump accommodation portion 64A accommodates the pump 4A. The tubular portion 511A extends in the Y axis direction and accommodates the motor 2. The plate portion 513A expands from the tubular portion 511A along the −X direction perpendicular to the Y axis direction. The peripheral wall portion 514A surrounds the inverter accommodation portion 63A when viewed from the Z axis direction perpendicular to the Y axis direction and the X axis direction, and is connected to the plate portion 513A.

The pump 4A supplies the oil CL accommodated in the housing 5A to the motor 2. The oil cooler 8A cools the oil CL. Similarly to the above-described example embodiment, the pump 4A and the oil cooler 8A are disposed at the −X direction-side end portion of the peripheral wall portion 514 of the housing 5A. The pump accommodation portion 64A is a recess portion that is recessed in the +X direction from the −X direction-side end portion of a peripheral wall portion 514A. Therefore, the pump 4A and the oil cooler 8A are disposed at the end portions in the front-rear direction, and it is therefore possible to suppress an increase in size of the drive device 1A in the X axis direction.

On the other hand, in the first modification, the pump 4A, the oil cooler 8A, and the first oil passage 551A to the third oil passage 553A of the oil passage 55A in the drive device 1A are different from those in the above-described example embodiment. For example, as shown in FIG. 9, the oil cooler 8A is disposed on the +Y direction side with respect to the pump 4A and the pump accommodation portion 64A. As shown in FIG. 10, the first oil passage 551A connects the lower portion of the gear accommodation portion 62A in the Z axis direction and the oil cooler 8A, and more specifically, connects the oil pool P (see FIG. 2) and the suction port of the oil cooler 8A. The second oil passage 552A connects the oil cooler 8A and the pump accommodation portion 64A, more specifically, connects the discharge port of the oil cooler 8A and the suction port 41A of the pump 4A. The third oil passage 553A connects the discharge port 43A of the pump accommodation portion 64A and the fourth oil passage 554 (see FIG. 1).

Figure 11:
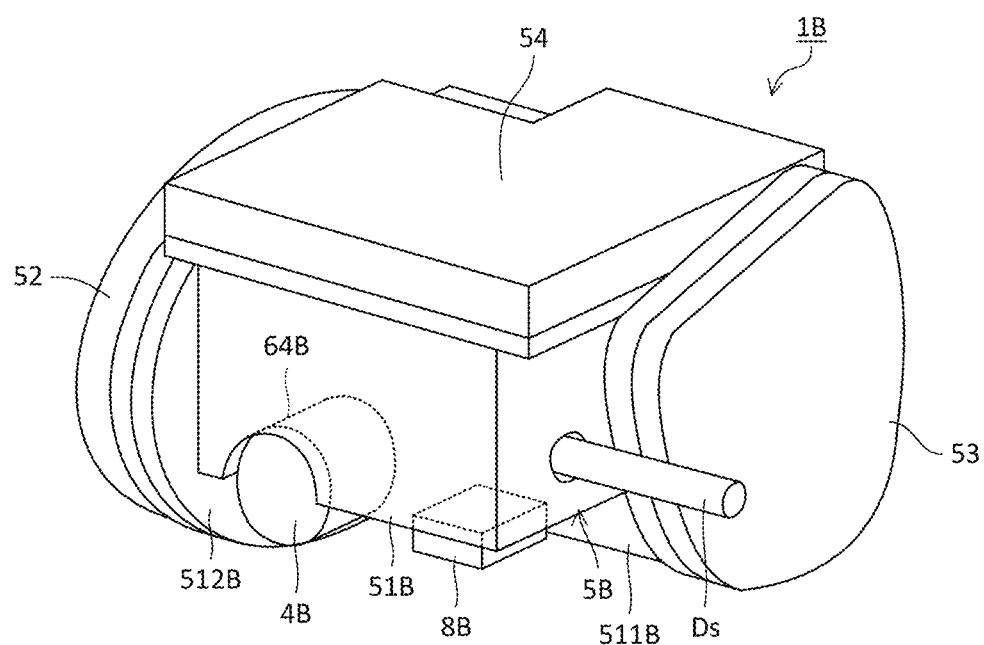
FIG. 11 is a perspective view showing a first configuration example of a drive device according to a second modification of an example embodiment of the present disclosure.
Figure 12:
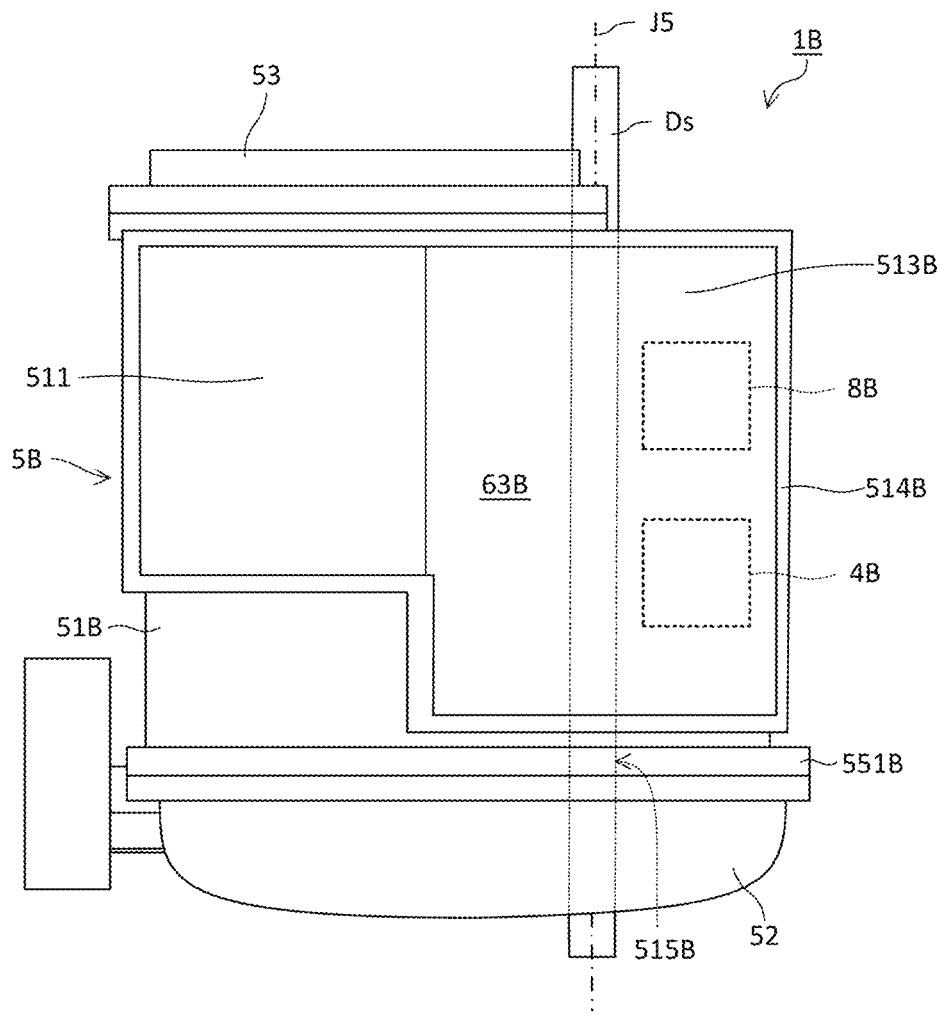
FIG. 12 is a plan view showing a disposition example of a pump and an oil cooler in the second modification.
Figure 13:
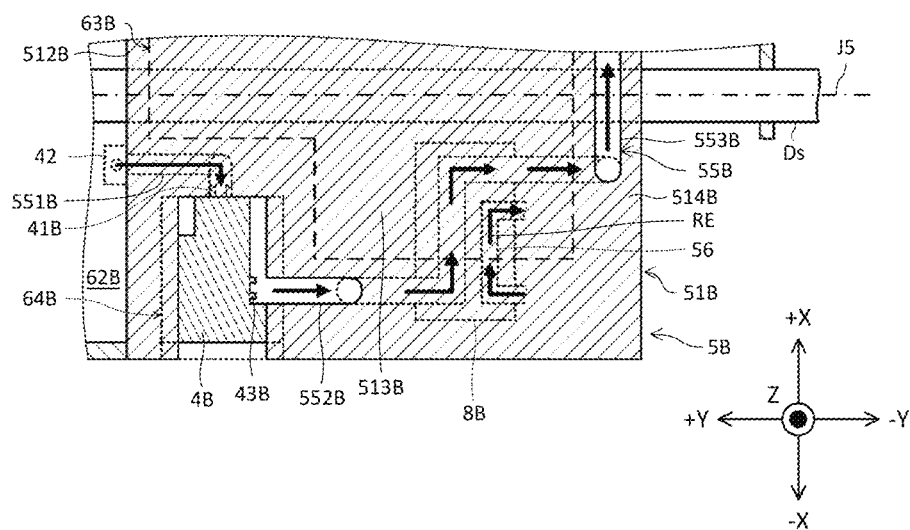
FIG. 13 is a schematic configuration view showing a disposition example of a first oil passage to a third oil passage according to the second modification when viewed from the Z axis direction.
Figure 14:
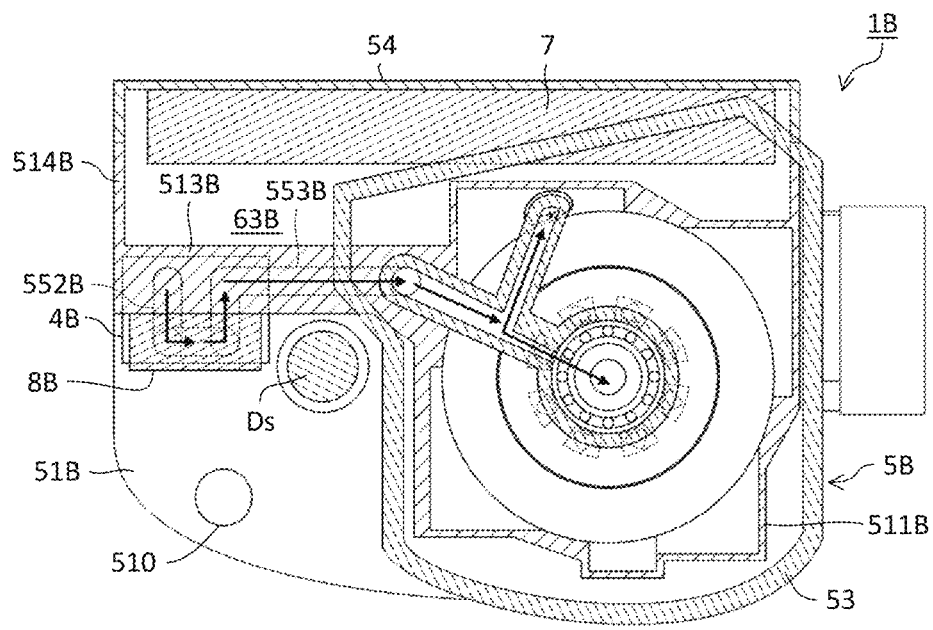
FIG. 14 is a schematic configuration view of a drive device according to the second modification viewed from the Y axis direction.
Figure 15:
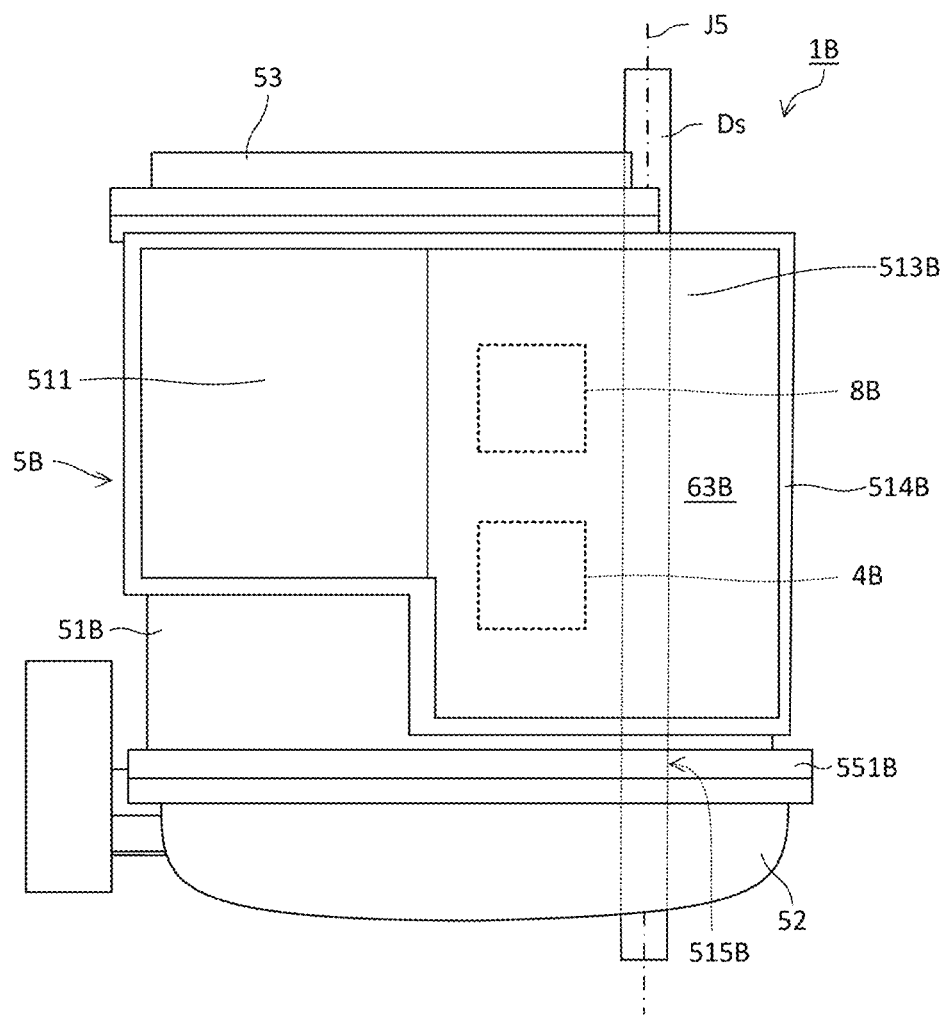
FIG. 15 is a plan view showing another disposition example of a pump and an oil cooler in the second modification.
Figure 16:
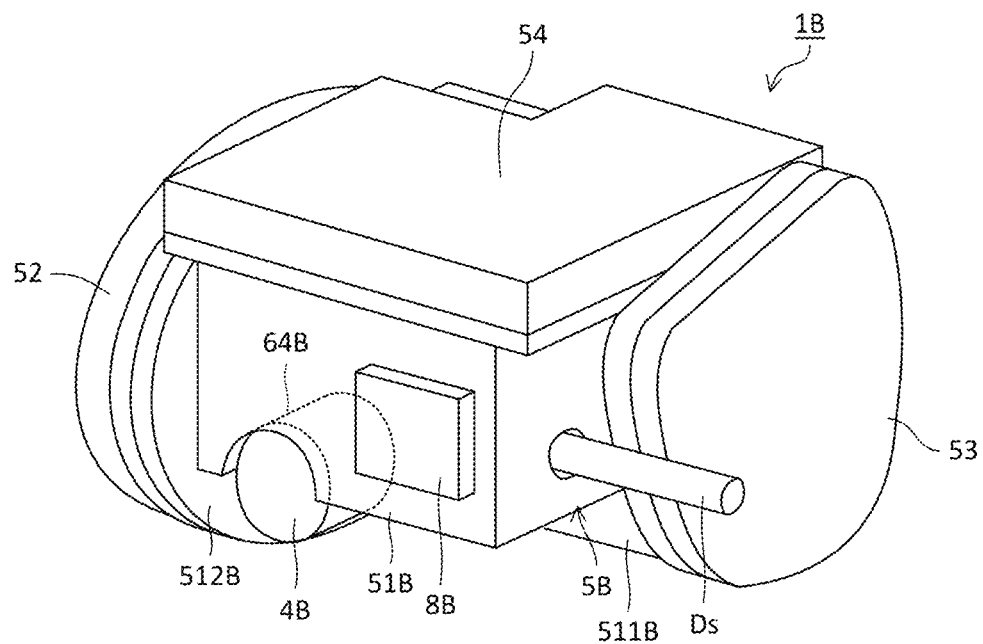
FIG. 16 is a perspective view showing a second configuration example of the drive device according to the second modification.

Next, the second modification of the disposition of a pump 4B and an oil cooler 8B will be described with reference to FIGS. 11 to 16. FIG. 11 is a perspective view showing the first configuration example of a drive device 1B according to the second modification. FIG. 12 is a plan view showing a disposition example of the pump 4B and the oil cooler 8B in the second modification. FIG. 13 is a schematic configuration view showing a disposition example of a first oil passage 551B to a third oil passage 553B according to the second modification when viewed from the Z axis direction. FIG. 14 is a schematic configuration view of the drive device 1B according to the second modification viewed from the Y axis direction. FIG. 15 is a plan view showing another disposition example of the pump 4B and the oil cooler 8B in the second modification. FIG. 16 is a perspective view showing a second configuration example of the drive device 1B according to the second modification. FIGS. 12 and 15 present the drive device 1B according to the second modification viewed from the +Z direction toward the −Z direction.

The drive device 1B according to the second modification includes a housing 5B, the pump 4B, and the oil cooler 8B.

The housing 5B accommodates the motor 2 and the inverter (see, for example, FIG. 2). The housing 5B includes a gear accommodation portion 62B, an inverter accommodation portion 63B, a pump accommodation portion 64B, a tubular portion 511B, a side plate portion 512B, a plate portion 513B, and a peripheral wall portion 514B. The gear accommodation portion 62B accommodates the gear portion 3 (see FIG. 1). The inverter accommodation portion 63B accommodates the inverter 7 (see FIG. 2). The pump accommodation portion 64B accommodates the pump 4B. The tubular portion 511B extends in the Y axis direction and accommodates the motor 2. The side plate portion 512B has a plate shape intersecting the Y axis direction, and expands perpendicularly with the Y axis direction in the second modification. The side plate portion 512B is disposed at the +Y direction-side end portion of the tubular portion 511B. The plate portion 513B expands from the tubular portion 511B along the −X direction perpendicular to the Y axis direction. The peripheral wall portion 514B surrounds the inverter accommodation portion 63B when viewed from the Z axis direction perpendicular to the Y axis direction and the X axis direction, and is connected to the plate portion 513B.

The pump 4B supplies the oil CL accommodated in the housing 5B to the motor 2. The oil cooler 8B cools the oil CL. In the second modification, both the pump 4B and the oil cooler 8B are fixed to the plate portion 513B, and more specifically, are disposed at the −Z direction-side end portion of the plate portion 513B. This eliminates the need to secure a space for disposing the pump 4B and the oil cooler 8B in the −X direction with respect to the peripheral wall portion 514B, and hence it is possible to reduce the size of the drive device 1B in the X axis direction. Therefore, the drive device 1B can be further downsized.

In FIG. 11, the pump accommodation portion 64B is a recess portion that is recessed in the +X direction from the −X direction-side end portion of the peripheral wall portion 514B, and is also recessed in the +X direction from the −X direction-side end portion of the plate portion 513B. In FIG. 11, the pump 4B can be disposed in the housing 5B by inserting the pump 4B in the +X direction from the −X direction-side end portion of the peripheral wall portion 514B. Note that the configuration of the pump accommodation portion 64B is not limited to the example of FIG. 11. The pump accommodation portion 64B may be a recess portion recessed in the +X direction from the −X direction-side end portion of the plate portion 513B, that is, may not be recessed in the +X direction from the −X direction-side end portion of the peripheral wall portion 514B. In this case, the pump 4B can be disposed in the housing 5B by inserting the pump 4B in the +Z direction from the −Z direction-side end portion of the plate portion 513B.

The side plate portion 512B has the first drive shaft passage hole 515B. The first drive shaft passage hole 515B penetrates the side plate portion 512B in the Y axis direction. The drive shaft Ds extending along the Y axis direction is inserted into the first drive shaft passage hole 515B. Preferably, in the second modification, at least one of the pump 4B and the oil cooler 8B is disposed in the −X direction or the +X direction with respect to the drive shaft Ds when viewed from the Z axis direction. In other words, at least one of the pump 4B and the oil cooler 8B is disposed at a position not overlapping the drive shaft Ds in the Z axis direction, and is disposed side by side with the drive shaft Ds in the X axis direction.

For example, in FIGS. 11 to 14, both the pump 4B and the oil cooler 8B are disposed in the −X direction with respect to the drive shaft Ds. However, the present disclosure is not limited to this example, and both the pump 4B and the oil cooler 8B may be disposed in the +X direction with respect to the drive shaft Ds as shown in FIG. 15. Alternatively, one of the pump 4B and the oil cooler 8B may be disposed in the −X direction with respect to the drive shaft Ds, and the other may be disposed in the +X direction with respect to the drive shaft Ds.

Alternatively, only one of the pump 4B and the oil cooler 8B may be disposed in the −X direction or the +X direction with respect to the drive shaft Ds. At this time, the other may be disposed at a position overlapping the drive shaft Ds when viewed from the Z axis direction.

Thus, at least one of the pump 4B and the oil cooler 8B is not disposed at a position overlapping the drive shaft Ds viewed from the Z axis direction. Therefore, the size of the drive device 1B in the Z axis direction can be reduced. However, the above-described example does not exclude a configuration in which both the pump 4B and the oil cooler 8B are disposed at positions overlapping the drive shaft Ds when viewed from the Z axis direction.

In FIGS. 11 to 15, the pump 4B and the pump accommodation portion 64B are disposed on the +Y direction side with respect to the oil cooler 8B. In this case, as shown in FIG. 13, in the oil passage 55B, the first oil passage 551B connects the lower portion of the gear accommodation portion 62B in the Z axis direction and the pump accommodation portion 64B, and more specifically, connects the oil pool P (see FIG. 2) and the suction port 41B of the pump 4B. The second oil passage 552B connects the pump accommodation portion 64B and the oil cooler 8B, more specifically, connects the suction port 41B of the pump 4B and the suction port of the oil cooler 8B. The third oil passage 553B connects (the discharge port of) the oil cooler 8B and the fourth oil passage 554 (see FIG. 1).

However, the present disclosure is not limited to the examples of FIGS. 11 to 15, and similarly to the first modification (see FIG. 10), the oil cooler 8B may be disposed on the +Y direction side with respect to the pump 4B and the pump accommodation portion 64B. In this case, the first oil passage 551B connects the lower portion of the gear accommodation portion 62B in the Z axis direction and the oil cooler 8B, and more specifically, connects the oil pool P (see FIG. 2) and the suction port of the oil cooler 8B. The second oil passage 552B connects the oil cooler 8B and the pump accommodation portion 64B, more specifically, connects the discharge port of the oil cooler 8B and the suction port 41B of the pump 4B. The third oil passage 553B connects the discharge port 43B of the pump accommodation portion 64B and the fourth oil passage 554 (see FIG. 1).

The disposition of the pump 4C and the oil cooler 8C in the second modification is not limited to the examples of FIGS. 11 to 15. For example, as shown in FIG. 16, the pump 4C may be disposed at the −Z direction-side end portion of the plate portion 513C, while the oil cooler 8C may be disposed at the −X direction-side end portion of the peripheral wall portion 514C. Alternatively, the oil cooler 8C may be disposed at the −Z direction-side end portion of the plate portion 513C, while the pump 4C may be disposed at the −X direction-side end portion of the peripheral wall portion 514C. Also due to these, the drive device 1C can be further downsized similarly to the configurations of FIGS. 11 to 15.

Figure 17:
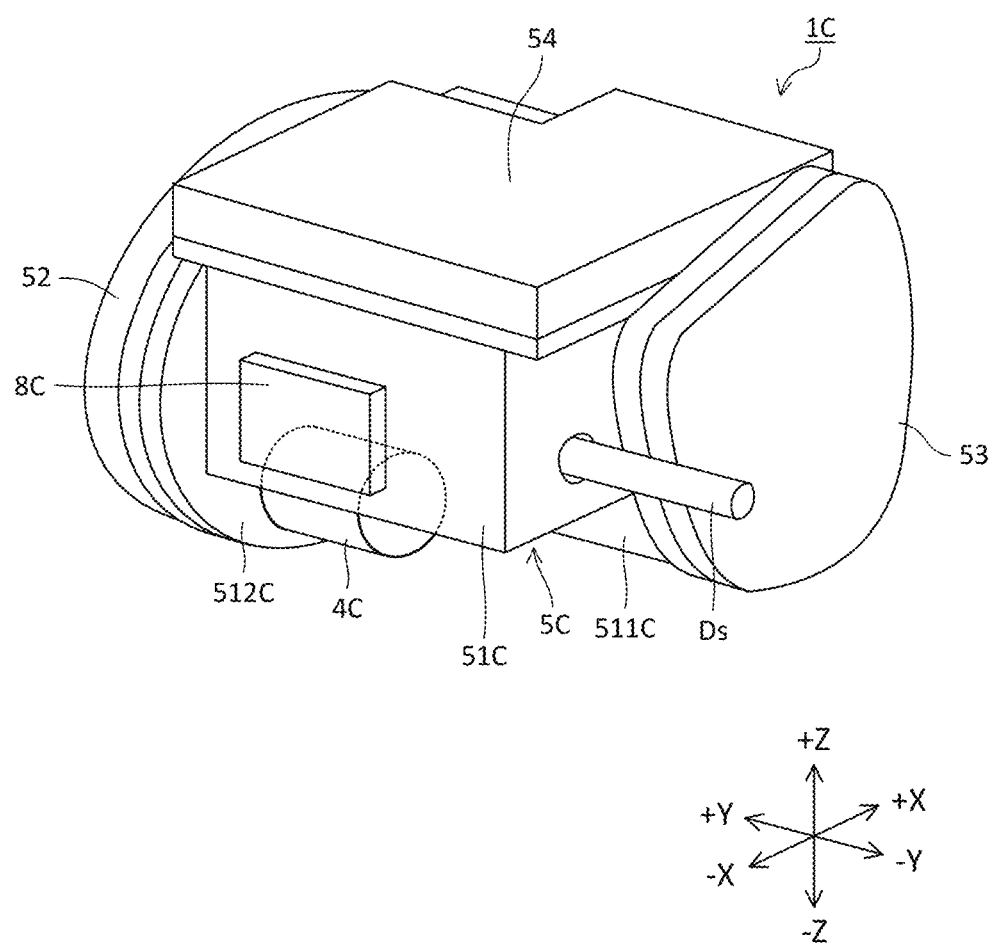
FIG. 17 is a perspective view showing a first configuration example of a drive device according to a third modification of an example embodiment of the present disclosure.
Figure 18:
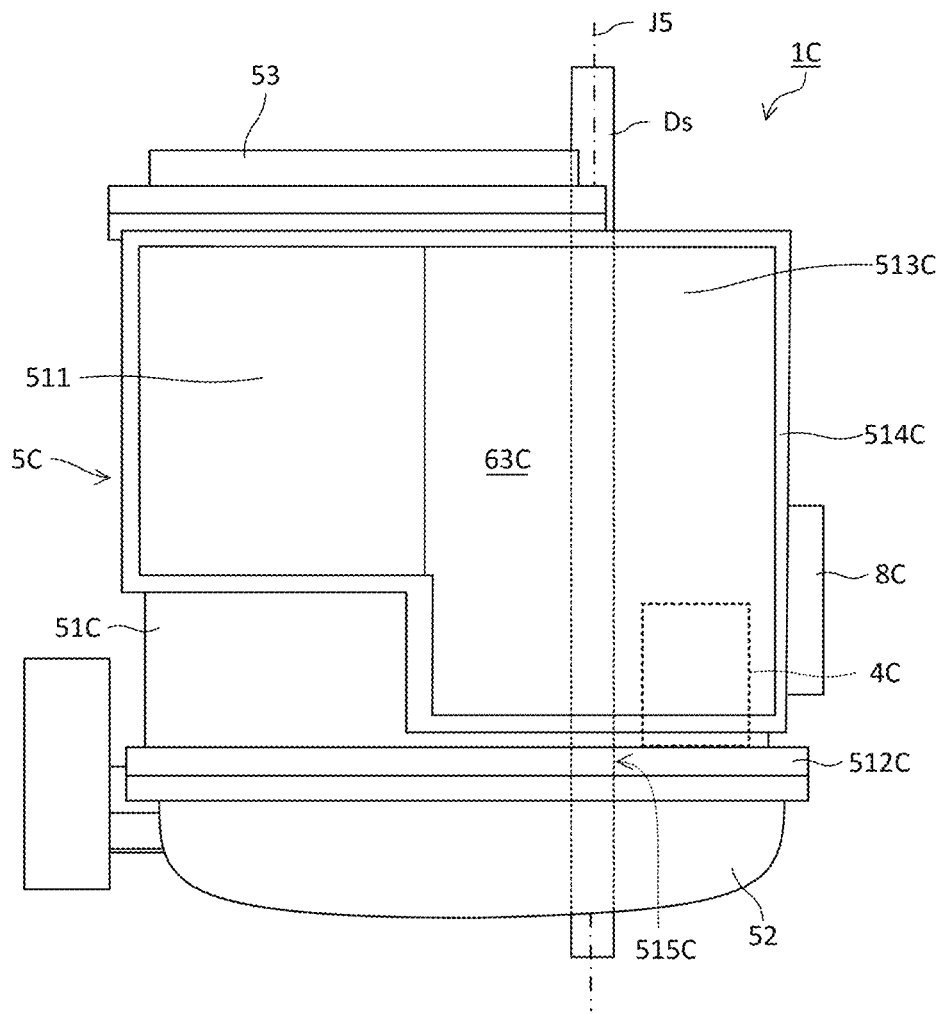
FIG. 18 is a plan view showing a disposition example of a pump and an oil cooler in the third modification.
Figure 18:
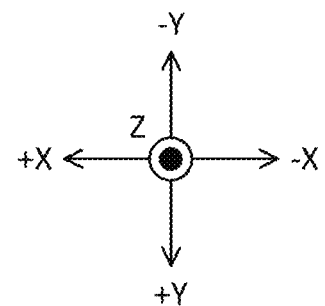
Figure 19:
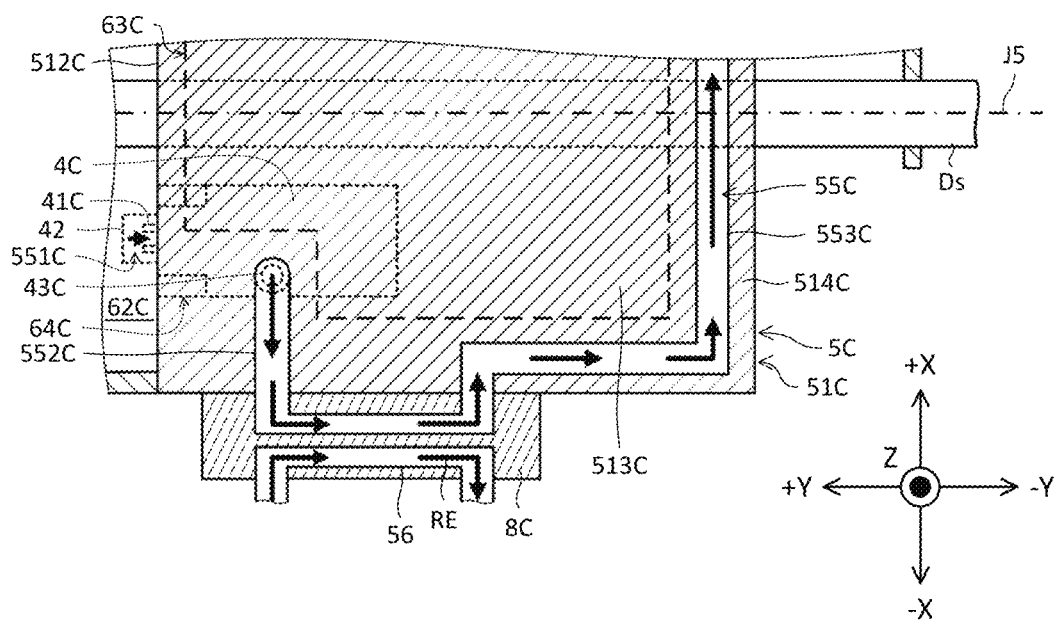
FIG. 19 is a schematic configuration view showing a disposition example of a first oil passage to a third oil passage according to the third modification when viewed from the Z axis direction.
Figure 20:
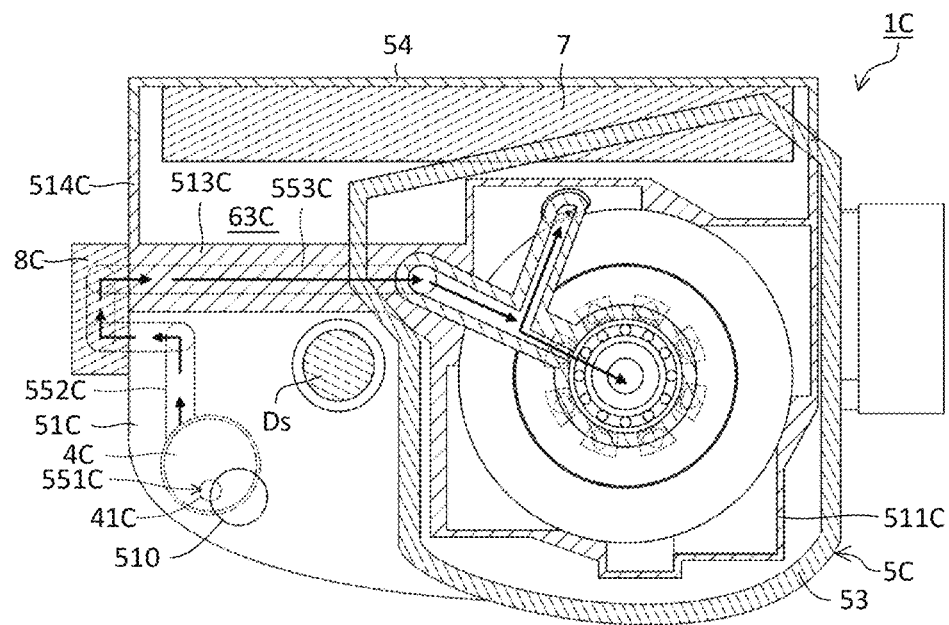
FIG. 20 is a schematic configuration view of a drive device according to the third modification viewed from the Y axis direction.
Figure 21:
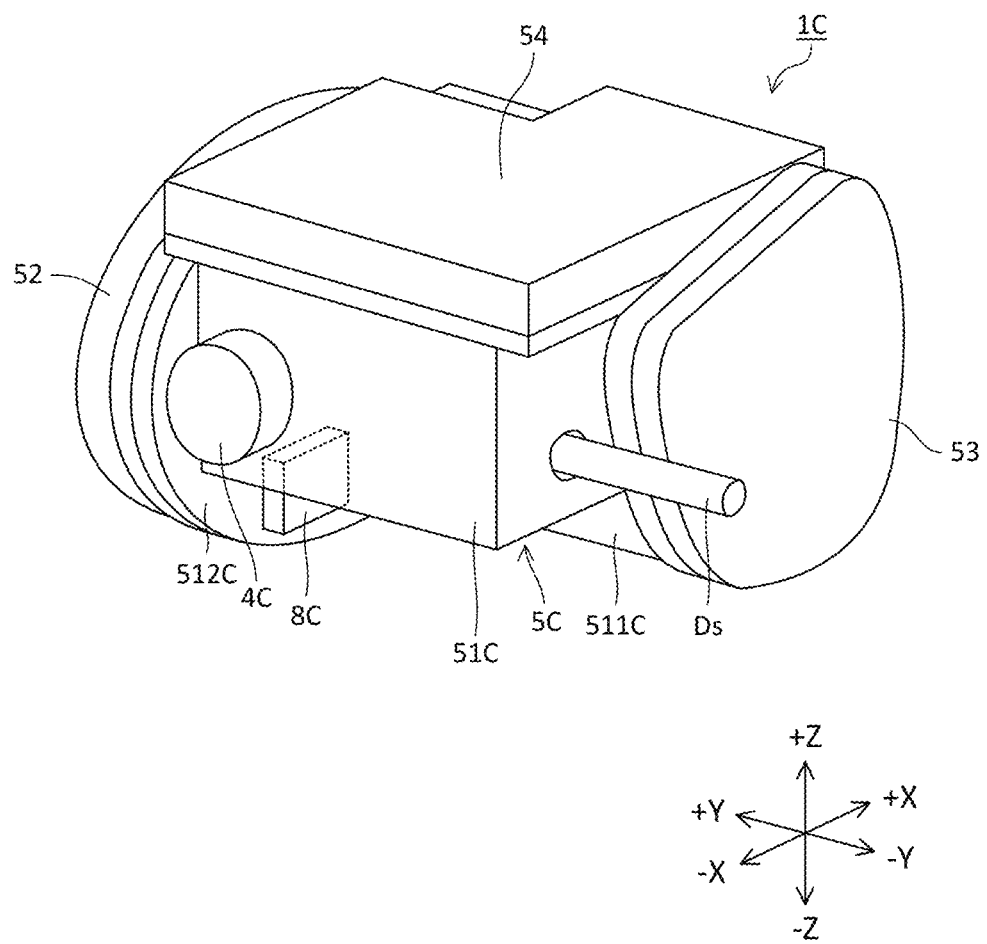
FIG. 21 is a perspective view showing a second configuration example of the drive device according to the third modification.
Figure 22:
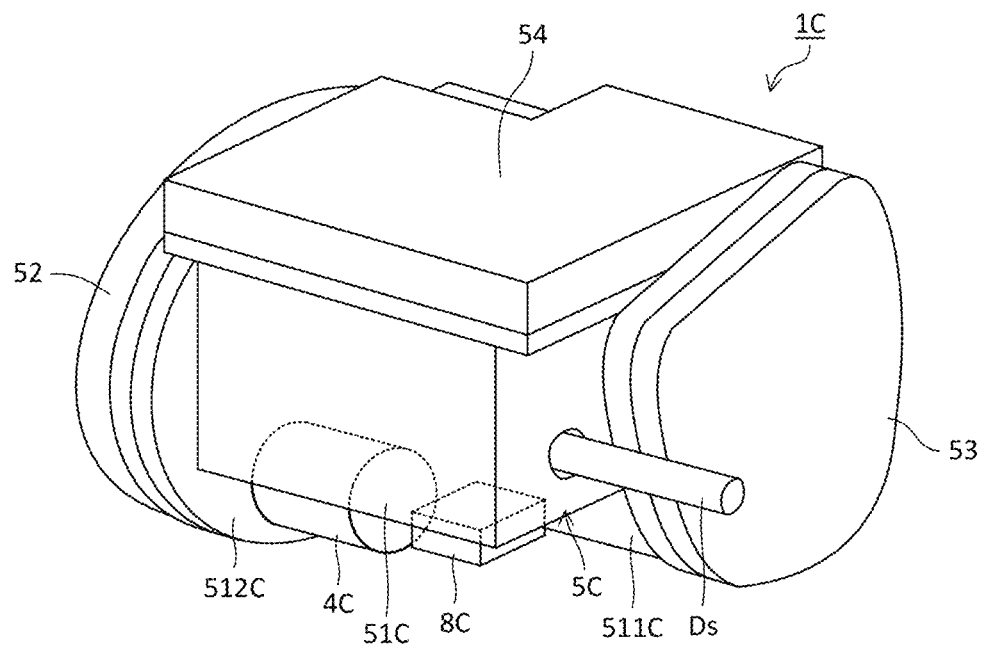
FIG. 22 is a perspective view showing a third configuration example of the drive device according to the third modification.
Figure 23:
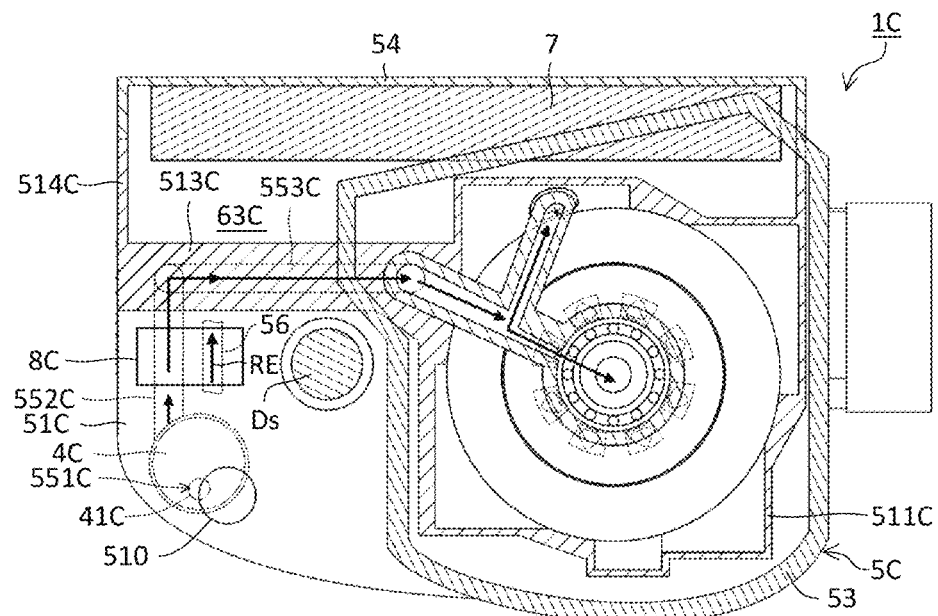
FIG. 23 is a perspective view showing a fourth configuration example of the drive device according to the third modification.
Figure 23:
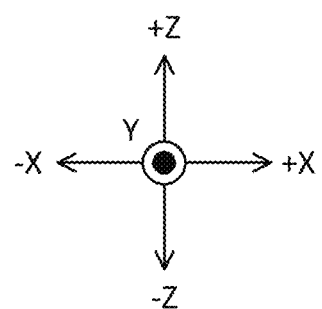

Next, the third modification of the disposition of the pump 4C and the oil cooler 8C will be described with reference to FIGS. 17 to 23. FIG. 17 is a perspective view showing a first configuration example of the drive device 1C according to the third modification. FIG. 18 is a plan view showing a disposition example of the pump 4C and the oil cooler 8C in the third modification. FIG. 19 is a schematic configuration view showing a disposition example of a first oil passage 551C to a third oil passage 553C according to the third modification when viewed from the Z axis direction. FIG. 20 is a schematic configuration view of the drive device 1C according to the third modification viewed from the Y axis direction. FIG. 21 is a perspective view showing a second configuration example of the drive device 1C according to the third modification. FIG. 22 is a perspective view showing a third configuration example of the drive device 1C according to the third modification. FIG. 23 is a perspective view showing a fourth configuration example of the drive device 1C according to the third modification. Note that FIG. 18 presents the drive device 1C according to the third modification viewed from the +Z direction toward the −Z direction.

The drive device 1C according to the third modification includes a housing 5C, the pump 4C, and the oil cooler 8C.

The housing 5C accommodates the motor 2 and the inverter (see, for example, FIG. 2). The housing 5C includes a gear accommodation portion 62C, an inverter accommodation portion 63C, a pump accommodation portion 64C, a tubular portion 511C, a side plate portion 512C, a plate portion 513C, and a peripheral wall portion 514C. The gear accommodation portion 62C accommodates the gear portion 3 (see FIG. 1). The inverter accommodation portion 63C accommodates the inverter 7 (see FIG. 2). The pump accommodation portion 64C accommodates a portion on the +Y direction side of the pump 4C. The tubular portion 511C extends in the Y axis direction and accommodates the motor 2. The side plate portion 512C has a plate shape intersecting the Y axis direction, and expands perpendicularly with the Y axis direction in the third modification. The side plate portion 512C is disposed at the +Y direction-side end portion of the tubular portion 511C. The plate portion 513C expands from the tubular portion 511C along the −X direction perpendicular to the Y axis direction. The peripheral wall portion 514C surrounds the inverter accommodation portion 63C when viewed from the Z axis direction perpendicular to the Y axis direction and the X axis direction, and is connected to the plate portion 513C.

The pump 4C supplies the oil CL accommodated in the housing 5C to the motor 2. The oil cooler 8C cools the oil CL. In the third modification, the pump 4C is fixed to the side plate portion 512C, and more specifically, is disposed at the −Y direction-side end portion of the side plate portion 512C. The oil cooler 8C is fixed to the peripheral wall portion 514C, and more specifically, is disposed at the −X direction-side end portion of the peripheral wall portion 514C. This eliminates the need to secure a space for disposing the pump 4C in the −X direction with respect to the peripheral wall portion 514C, and hence it is possible to reduce the size of the drive device 1C in the X axis direction. Therefore, the drive device 1C can be further downsized.

In FIGS. 17 to 20, the pump accommodation portion 64C is a recess portion that is recessed in the +Y direction from the −Y direction-side end portion of the side plate portion 512C. In FIGS. 17 to 20, the pump 4C can be disposed in the side plate portion 512C by inserting the pump 4C in the +Y direction into the pump accommodation portion 64C disposed at the −Y direction-side end portion of the side plate portion 512C.

The side plate portion 512C has the first drive shaft passage hole 515C. The first drive shaft passage hole 515C penetrates the side plate portion 512C in the Y axis direction. The drive shaft Ds extending along the Y axis direction is inserted into the first drive shaft passage hole 515C. Preferably, in the third modification, the pump 4C is disposed in the −X direction or the +X direction with respect to the drive shaft Ds when viewed from the Z axis direction. In other words, the pump 4C is disposed at a position not overlapping the drive shaft Ds in the Z axis direction, and is disposed side by side with the drive shaft Ds in the X axis direction.

For example, in FIG. 18, the pump 4C is disposed in the −X direction with respect to the drive shaft Ds. However, the present disclosure is not limited to this example, and the pump 4C may be disposed in the +X direction with respect to the drive shaft Ds. Thus, the pump 4C is not disposed at a position overlapping the drive shaft Ds viewed from the Z axis direction, and it is hence possible to reduce the size of the drive device 1C in the Z axis direction. However, the above-described example does not exclude a configuration in which both the pump 4C is disposed at a position overlapping the drive shaft Ds when viewed from the Z axis direction.

As shown in FIGS. 19 and 20, in the oil passage 55C, the first oil passage 551C connects the lower portion of the gear accommodation portion 62C in the Z axis direction and the pump accommodation portion 64C, and more specifically, connects the oil pool P (see FIG. 2) and the suction port 41C of the pump 4C. The second oil passage 552C connects the pump accommodation portion 64C and the oil cooler 8C, more specifically, connects the suction port 41C of the pump 4C and the suction port of the oil cooler 8C. The third oil passage 553C connects (the discharge port of) the oil cooler 8C and the fourth oil passage 554 (see FIG. 1).

The disposition of the pump 4C and the oil cooler 8C in the third modification is not limited to the examples of FIGS. 17 to 20. For example, as shown in FIG. 21, the pump 4C may be fixed to the peripheral wall portion 514C, and more specifically, may be disposed at the −X direction-side end portion of the peripheral wall portion 514C. The oil cooler 8C may be fixed to the side plate portion 512C, and more specifically, may be disposed at the −Y direction-side end portion of the side plate portion 512C.

Alternatively, the pump 4C may be disposed at the −Y direction-side end portion of the side plate portion 512C, while the oil cooler 8C may be disposed at the −Z direction-side end portion of the plate portion 513C. Or, the oil cooler 8C may be disposed at the −Y direction-side end portion of the side plate portion 512C, while the pump 4C may be disposed at the −Z direction-side end portion of the plate portion 513C.

Alternatively, as shown in FIG. 22, both the pump 4C and the oil cooler 8C may be fixed to the side plate portion 512C, more specifically, may be disposed at the −Z direction-side end portion of the side plate portion 512C. At this time, the pump 4C and the oil cooler 8C may be arranged in the X axis direction or may be arranged in the Z axis direction (see FIG. 22).

Also due to these, the drive device 1C can be further downsized similarly to the configurations of FIGS. 17 to 20.

Figure 24:
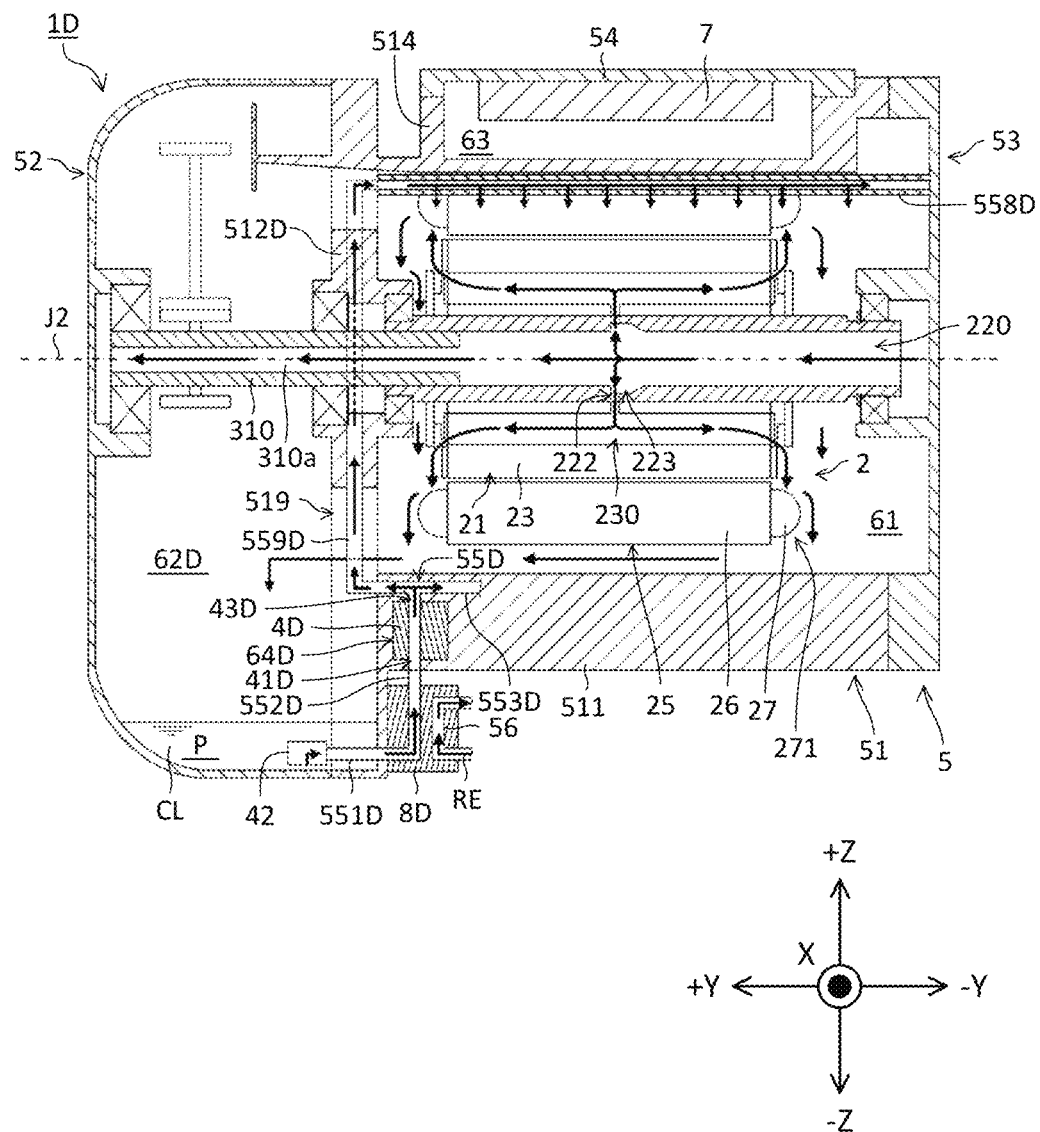
FIG. 24 is a schematic configuration view of a drive device according to the fourth modification viewed from the X axis direction.

Next, the fourth modification will be described with reference to FIG. 24. FIG. 24 is a schematic configuration view of a drive device 1D according to the fourth modification viewed from the X axis direction.

In the drive device 1D according to the fourth modification, an oil passage 55D through which the oil CL flows further includes a fifth oil passage 559D. The fourth modification is different from the example embodiment and the first to third modifications in this point.

For example, the first oil passage 551D connects the lower portion of the gear accommodation portion 62D in the Z axis direction and the oil cooler 8D, and more specifically, connects the oil pool P (see FIG. 2) and the suction port of the oil cooler 8D. The second oil passage 552D connects the oil cooler 8D and the pump accommodation portion 64D, more specifically, connects the discharge port of the oil cooler 8D and the suction port 41D of the pump 4D. A third oil passage 553D connects the discharge port 43D of the pump accommodation portion 64D and the fourth oil passage 554 (see FIG. 1).

The fifth oil passage 559D connects the third oil passage 553D and an oil supply portion 558D. For example, one end portion of the fifth oil passage 559D is connected to the third oil passage 553D. The other end portion of the fifth oil passage 559D is connected to the +Y direction-side end portion of the oil supply portion 558D.

At least a part of the fifth oil passage 559D is disposed inside a side plate portion 512D. Oil can be sent to the oil supply portion 558D that supplies the oil CL to the stator 25 through the fifth oil passage 559D disposed in the side plate portion 512D. Therefore, the fifth oil passage 559D can be further shortened. That is, the path length of the flow of the oil CL between the third oil passage 553D and the oil supply portion 558D can be further shortened. Therefore, the oil CL can be efficiently sent to the oil supply portion 558D.

The drive devices 1, 1A, 1B, 1C, and 1D described above include the motor 2, the inverter 7, the housing 5, the pumps 4, 4A, 4B, 4C, and 4D, and the oil coolers 8, 8A, 8B, 8C, and 8D. The motor 2 includes the rotor 21 having the motor shaft 22, and the stator 25. The motor shaft 22 is rotatable about the rotation axis J2 extending along the Y axis direction (first direction). The stator 25 is disposed radially outward of the rotor 21. The inverter 7 supplies drive electric power to the motor 2. The housings 5, 5A, 5B, and 5C accommodate the motor 2 and the inverter 7. The pumps 4, 4A, 4B, 4C, and 4D supply the oil CL accommodated in the housing 5, 5A, 5B, and 5C to the motor 2. The oil coolers 8, 8A, 8B, 8C, and 8D cool the oil CL. The housings 5, 5A, 5B, and 5C include the inverter accommodation portions 63, 63B, and 63C, the tubular portions 511, 511A, 511B, and 511C, the side plate portions 512, 512B, 512C, and 512D, the plate portions 513, 513A, 513B, and 513C, and the peripheral wall portions 514, 514A, 514B, and 514C. The inverter accommodation portions 63, 63B, and 63C accommodate the inverter 7. The tubular portions 511, 511A, 511B, and 511C extend in the Y axis direction (first direction), and accommodate the motor 2. The side plate portions 512, 512B, 512C, and 512D have a plate shape intersecting the Y axis direction (first direction), and are disposed at the +Y direction-side end portions (one side in the first direction) of the tubular portions 511, 511A, 511B, and 511C. The plate portions 513, 513A, 513B, and 513C expand from the tubular portions 511, 511A, 511B, and 511C along the −X direction (one side in the second direction) perpendicular to the Y axis direction (first direction). The peripheral wall portions 514, 514A, 514B, and 514C surround the inverter accommodation portions 63, 63B, and 63C when viewed from the Y axis direction (first direction) and the Z axis direction (third direction) perpendicular to the X axis direction (second direction), and are connected to the plate portions 513, 513A, 513B, and 513C. Each of the pumps 4, 4A, 4B, 4C, and 4D and the oil coolers 8, 8A, 8B, 8C, and 8D is disposed at any of the −X direction-side end portions (one side in the second direction) of the peripheral wall portions 514, 514A, 514B, and 514C, the −Z direction-side end portions (the other side in the third direction) of the plate portions 513, 513A, 513B, and 513C, and the −Y direction-side end portions (the other side in the first direction) of the side plate portions 512, 512B, 512C, and 512D.

By disposing the pumps 4, 4A, 4B, 4C, and 4D and the oil coolers 8, 8A, 8B, 8C, and 8D as described above, the drive devices 1, 1A, 1B, 1C, and 1D can be further downsized. For example, the pumps 4, 4A, 4B, 4C, and 4D and the oil coolers 8, 8A, 8B, 8C, and 8D are not disposed on the −X direction (one side in the second direction) side or the +X direction (the other side in the second direction) side of the housings 5, 5A, 5B, and 5C, whereby it is possible to reduce the size of the drive devices 1, 1A, 1B, 1C, and 1D in the X axis direction (second direction). Furthermore, the pumps 4, 4A, 4B, 4C, and 4D and the oil coolers 8, 8A, 8B, 8C, and 8D are not disposed on the +Z direction (one side in the third direction) side of the housings 5, 5A, 5B, and 5C, whereby it is possible to reduce the size of the drive devices 1, 1A, 1B, 1C, and 1D in the Z axis direction (third direction).

In addition, members are often less disposed in a space in the −Z direction (the other side in the third direction) with respect to the plate portions 513, 513A, 513B, and 513C, and the space is likely to become a dead space. Therefore, the above-described dead space can be effectively used by disposing at least one of the pumps 4, 4A, 4B, 4C, and 4D and the oil coolers 8, 8A, 8B, 8C, and 8D at one of the −Z direction-side end portion (the other side in the third direction) of the plate portions 513, 513A, 513B, and 513C or the −Y direction-side end portion (the other side in the first direction) of the side plate portions 512, 512B, 512C, and 512D. Furthermore, it is possible to secure a space in which other members (e.g., electronic components) can be freely disposed in the −X direction (one side in the second direction) with respect to the peripheral wall portions 514, 514B and 514C. Alternatively, this contributes to downsizing of the drive devices 1, 1A, 1B, 1C, and 1D in the X axis direction (second direction).

In the drive devices 1, 1A, 1B, 1C, and 1D described above, the housings 5, 5A, 5B, and 5C may have the pump accommodation portions 64, 64A, 64B, 64C, and 64D that accommodate the pumps 4, 4A, 4B, 4C, and 4D. The pump accommodation portions 64, 64A, 64B, 64C, and 64D may be recess portions that are recessed in at least one of the +X direction (the other side in the second direction) from the −X direction-side end portions (one side in the second direction) of the peripheral wall portions 514, 514A, 514B, and 514C and the +Z direction (one side in the third direction) from the −Z direction-side end portions (the other side in the third direction) of the plate portions 513, 513A, 513B, and 513C.

Thus, the pumps 4, 4A, 4B, 4C, and 4D can be disposed in the housings 5, 5A, 5B, and 5C by inserting the pumps 4, 4A, 4B, 4C, and 4D into the pump accommodation portions 64, 64A, 64B, 64C, and 64D disposed at least at one of the end portions on the −X direction (one side in the second direction) side of the peripheral wall portions 514, 514A, 514B, and 514C and the end portions on the −Z direction (the other side in the third direction) side of the plate portions 513, 513A, 513B, and 513C.

In the drive devices 1 and 1A described above, the pumps 4 and 4A and the oil coolers 8 and 8A may be disposed at the −X direction-side end portions (one side in the second direction) of the peripheral wall portions 514, 514A, and 514B. Alternatively, in the drive device 1B described above, the pump 4B and the oil cooler 8B may be disposed at the −Z direction-side end portion (the other side in the third direction) of the plate portion 513B.

Thus, the drive devices 1, 1A, and 1B can be further downsized.

In the drive devices 1C and 1D described above, the housings 5 and 5C may have the pump accommodation portions 64C and 64D that accommodate portions of the +Y direction (one side in the first direction) side of the pumps 4C and 4D. The pump accommodation portions 64C and 64D may be recess portions that are recessed in the +Y direction (one side in the first direction) from the −Y direction-side end portions (the other side in the first direction) of the side plate portions 512C and 512D.

Thus, the pumps 4C and 4D can be disposed in the side plate portions 512C and 512D by inserting the pumps 4C and 4D in the +Y direction (one side in the first direction) into the pump accommodation portions 64C and 64D disposed at the −Y direction-side end portion (the other side in the first direction) of the side plate portions 512C and 512D.

In the drive devices 1C and 1D described above, one of the pumps 4C and 4D and the oil coolers 8C and 8D may be disposed at the −X direction-side end portions (one side in the second direction) of the peripheral wall portions 514C and 514D. The other of the pumps 4C and 4D and the oil coolers 8C and 8D may be disposed at the −Y direction-side end portions (the other side in the first direction) of the side plate portions 512C and 512D.

Thus, the drive devices 1C and 1D can be further downsized.

In the drive devices 1, 1A, 1B, 1C, and 1D described above, the side plate portions 512, 512B, 512C, and 512D have the first drive shaft passage holes (drive shaft passage holes) 515, 515B, and 515C through which the drive shaft Ds extending along the Y axis direction (first direction) is inserted. The first drive shaft passage holes (drive shaft passage holes) 515, 515B, and 515C penetrate the side plate portions 512, 512B, 512C, and 512D in the Y axis direction (first direction). At least one of the pumps 4, 4A, 4B, 4C, and 4D and the oil coolers 8, 8A, 8B, 8C, and 8D may be disposed in the −X direction (one side in the second direction) or the +X direction (the other side in the second direction) with respect to the drive shaft Ds.

Thus, at least one of the pumps 4, 4A, 4B, 4C, and 4D and the oil coolers 8, 8A, 8B, 8C, and 8D is not disposed at a position overlapping the drive shaft Ds viewed from the Z axis direction (third direction), and it is hence possible to reduce the size of the drive devices 1, 1A, 1B, 1C, and 1D in the Z axis direction (third direction). For example, at least one of the pumps 4, 4A, 4B, 4C, and 4D and the oil coolers 8, 8A, 8B, 8C, and 8D is not disposed between the plate portions 513, 513A, 513B, and 513C and the drive shaft Ds. Therefore, it is possible to further narrow the interval between the plate portions 513, 513A, 513B, and 513C and the drive shaft Ds in the Z axis direction (third direction). When at least one of the pumps 4, 4A, 4B, 4C, and 4D and the oil coolers 8, 8A, 8B, 8C, and 8D is disposed in the side plate portions 512, 512B, 512C, and 512D, for example, a space for disposing at least one of them described above in the −Z direction (the other of the third direction) with respect to the drive shaft Ds may not be secured. This contributes to downsizing of the drive devices 1, 1A, 1B, 1C, and 1D.

The drive devices 1, 1A, 1B, 1C, and 1D described above further include the gear portion 3. The gear portion 3 is connected to the +Y direction-side end portion (one side in the first direction) of the motor shaft 22. The housings 5, 5A, 5B, and 5C further include the motor accommodation portion 61 that accommodates the motor 2, the gear accommodation portions 62, 62A, 62B, 62C, and 62D that accommodate the gear portion 3, and the oil passages 55, 55A, 55B, 55C, and 55D through which the oil CL flows. The oil passages 55, 55A, 55B, 55C, and 55D include the first oil passages 551, 551A, 551B, 551C, and 551D, the second oil passages 552, 552A, 552B, 552C, and 552D, the third oil passages 553, 553A, 553B, 553C, and 553D, and the fourth oil passage 554. The first oil passages 551, 551A, 551B, 551C, and 551D may connect the gear accommodation portions 62, 62A, 62B, 62C, and 62D and the suction port of one member of the pumps 4, 4A, 4B, 4C, and 4D and the oil coolers 8, 8A, 8B, 8C, and 8D. The second oil passages 552, 552A, 552B, 552C, and 552D may connect the discharge port of one member and the suction port of the other member of the pumps 4, 4A, 4B, 4C, and 4D and the oil coolers 8, 8A, 8B, 8C, and 8D. The third oil passages 553, 553A, 553B, 553C, and 553D may connect the discharge port of the other member and the fourth oil passage 554. The fourth oil passage 554 may connect the third oil passages 553, 553A, 553B, 553C, and 553D and the motor accommodation portion 61.

In this way, it is possible to dispose one member of the pumps 4, 4A, 4B, 4C, and 4D and the oil coolers 8, 8A, 8B, 8C, and 8D upstream (i.e., the flow of the oil CL in the oil passages 55, 55A, 55B, 55C, and 55D on the gear accommodation portions 62, 62A, 62B, 62C, and 62D side) relative to the other member, and to send the oil CL from the gear accommodation portions 62, 62A, 62B, 62C, and 62D to the motor accommodation portion 61.

Furthermore, in the above-described drive devices 1, 1A, 1B, 1C, and 1D, the above-described one member may be disposed in the +Y direction (one side in the first direction) with respect to the above-described other member.

Thus, one member of the pumps 4, 4A, 4B, 4C, and 4D and the oil coolers 8, 8A, 8B, 8C, and 8D can be disposed at a position closer to the gear accommodation portions 62, 62A, 62B, 62C, and 62D than the other member. Therefore, one member can be disposed upstream (i.e., the flow of the oil CL in the oil passages 55, 55A, 55B, 55C, and 55D on the gear accommodation portions 62, 62A, 62B, 62C, and 62D side) relative to the other member without making the oil passages 55, 55A, 55B, 55C, and 55D too complicated in configuration.

The drive devices 1, 1A, 1B, 1C, and 1D described above may further include the oil supply portion 558D. The oil supply portions 558 and 558D are accommodated in the tubular portion 511, disposed radially outward of the stator 25, and supply the oil CL to the stator 25. The oil passages 55, 55A, 55B, 55C, and 55D may further include the fifth oil passage 559D. The fifth oil passage 559D connects the third oil passages 553, 553A, 553B, 553C, and 553D and the oil supply portions 558 and 558D. At least a part of the fifth oil passage 559D may be disposed inside the side plate portions 512, 512B, 512C, and 512D.

In this way, the oil CL can be sent to the oil supply portions 558 and 558D that supply the oil CL to the stator 25 through the fifth oil passage 559D disposed in the side plate portions 512, 512B, 512C, and 512D. Therefore, the fifth oil passage 559D can be further shortened. That is, the path length of the flow of the oil CL between the third oil passages 553, 553A, 553B, 553C, and 553D and the oil supply portions 558 and 558D can be further shortened. Therefore, the oil CL can be efficiently sent to the oil supply portions 558 and 558D.

An example embodiment of the present disclosure has been described above. Note that the scope of the present disclosure is not limited to the above example embodiment. The present disclosure can be implemented by making various modifications to the above-described example embodiment without departing from the gist of the disclosure. In addition, the matters described in the above example embodiment can be discretionarily combined together as appropriate within a range where no inconsistency occurs.

The present disclosure is useful for a drive motor for a hybrid vehicle (HV), a plug-in hybrid vehicle (PHV), and an electric vehicle (EV), for example.

Features of the above-described preferred example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A drive device comprising:
    a motor that includes a rotor including a motor shaft rotatable about a rotation axis extending along a first direction, and a stator radially outward of the rotor;
    an inverter to supply drive power to the motor;
    a housing that accommodates the motor and the inverter;
    a pump to supply oil accommodated in the housing to the motor; and
    an oil cooler to cool the oil; wherein
    the housing includes:
        an inverter accommodation portion that accommodates the inverter;
        a tubular portion that extends in the first direction and accommodates the motor;
        a side plate portion that has a plate shape intersecting the first direction and is at one end portion of the tubular portion in the first direction;
        a plate portion that expands from the tubular portion along one of the first direction and a second direction perpendicular to the first direction; and
        a peripheral wall portion that surrounds the inverter accommodation portion when viewed from a third direction perpendicular to the first direction and the second direction, and is connected to the plate portion; and
    both of the pump and the oil cooler are at any of one end portion of the peripheral wall portion in the second direction, another end portion of the plate portion in the third direction, and another end portion of the side plate portion in the first direction.

2. The drive device according to claim 1, wherein
    the housing includes a pump accommodation portion that accommodates the pump; and
    the pump accommodation portion includes a recess portion that is recessed in at least one of another side in the second direction from one end portion of the peripheral wall portion in the second direction and one side in the third direction from another end portion of the plate portion in the third direction.

3. The drive device according to claim 1, wherein the pump and the oil cooler are at one end portion of the peripheral wall portion in the second direction.

4. The drive device according to claim 1, wherein the pump and the oil cooler are at another end portion of the plate portion in the third direction.

5. The drive device according to claim 1, wherein
    the housing includes a pump accommodation portion that accommodates a portion of the pump on one side in the first direction; and the pump accommodation portion is a recess portion that is recessed in one side in the first direction from another end portion of the side plate portion in the first direction.

6. The drive device according to claim 1, wherein
one of the pump and the oil cooler is at one end portion of the peripheral wall portion in the second direction; and
another of the pump and the oil cooler is at another end portion of the side plate portion in the first direction.

7. The drive device according to claim 1, wherein
the side plate portion includes a drive shaft passage hole through which a drive shaft extending along the first direction is inserted;
the drive shaft passage hole penetrates the side plate portion in the first direction; and
one of the pump and the oil cooler is inside another one of the pump and the oil cooler in the second direction with respect to the drive shaft.

8. The drive device according to claim 1, further comprising:
a gear portion that is connected to one end portion of the motor shaft in the first direction; wherein
the housing further includes:
a motor accommodation portion that accommodates the motor;
a gear accommodation portion that accommodates the gear portion; and
an oil passage through which the oil flows;
the oil passage includes a first oil passage, a second oil passage, a third oil passage, and a fourth oil passage;
the first oil passage connects the gear accommodation portion and a suction port of one of the pump and the oil cooler;
the second oil passage connects a discharge port of the one of the pump and the oil cooler and a suction port of another one of the pump and the oil cooler;
the third oil passage connects a discharge port of the another one of the of the pump and the oil cooler and the fourth oil passage; and
the fourth oil passage connects the third oil passage and the motor accommodation portion.

9. The drive device according to claim 8, further comprising:
an oil supply portion that is accommodated in the tubular portion, is radially outward of the stator, and supplies the oil to the stator; wherein
the oil passage further includes a fifth oil passage that connects the third oil passage and the oil supply portion; and
at least a portion of the fifth oil passage is inside the side plate portion.

10. The drive device according to claim 1, wherein the one of the pump and the oil cooler is on one side in the first direction with respect to the other one of the pump and the oil cooler.

* * * * *